United States Patent [19]

Cochran et al.

[11] Patent Number: 4,879,648

[45] Date of Patent: Nov. 7, 1989

[54] SEARCH SYSTEM WHICH CONTINUOUSLY DISPLAYS SEARCH TERMS DURING SCROLLING AND SELECTIONS OF INDIVIDUALLY DISPLAYED DATA SETS

[75] Inventors: Nancy P. Cochran, 35 Main St., Nyack, N.Y. 10960; Susan Byrnes, East Hartford, Conn.

[73] Assignee: Nancy P. Cochran, Nyack, N.Y.

[21] Appl. No.: 909,293

[22] Filed: Sep. 19, 1986

[51] Int. Cl.[4] ............................................. G06F 3/14
[52] U.S. Cl. ..................................... 364/300; 364/518
[58] Field of Search ........................................................
364/200 MS File:900 MS File, 518; 340/712

[56] References Cited

U.S. PATENT DOCUMENTS

| | | | |
|---|---|---|---|
| 3,531,795 | 9/1970 | Gassler | 340/324 |
| 3,670,310 | 6/1972 | Bharwani et al. | 364/200 |
| 3,792,613 | 2/1974 | Couture | 340/366 |
| 3,956,739 | 5/1976 | Ophir | 364/900 |
| 3,974,496 | 8/1976 | Aptroot-Soloway | 364/518 |
| 4,001,807 | 1/1977 | Dallimonti | 364/518 |
| 4,125,868 | 11/1978 | Hruby et al. | 364/900 |
| 4,194,349 | 3/1980 | Lane | 340/721 |
| 4,221,003 | 9/1980 | Chang et al. | 364/900 |
| 4,278,973 | 7/1981 | Hughes et al. | 340/721 |
| 4,342,085 | 7/1982 | Glickman et al. | 364/300 |
| 4,384,329 | 5/1983 | Rosenbaum et al. | 364/300 |
| 4,386,410 | 5/1983 | Pandya et al. | 364/518 |
| 4,412,294 | 10/1983 | Watts et al. | 364/518 |
| 4,417,239 | 11/1983 | Demke et al. | 340/709 |
| 4,419,756 | 12/1983 | Cheng Quispe et al. | 364/900 |
| 4,453,217 | 6/1984 | Boivie | 364/300 |
| 4,464,652 | 8/1984 | Lapson et al. | 340/716 |
| 4,531,186 | 7/1985 | Knapman | 364/300 |
| 4,533,910 | 8/1985 | Sukonick et al. | 340/721 |
| 4,535,420 | 8/1985 | Fung | 364/900 |
| 4,550,386 | 10/1985 | Hirosawa et al. | 364/900 |
| 4,554,631 | 11/1985 | Reddington | 364/300 |
| 4,566,065 | 1/1986 | Toth | 364/300 |
| 4,580,218 | 4/1986 | Raye | 364/300 |
| 4,586,035 | 4/1986 | Baker et al. | 340/365 UL |
| 4,586,036 | 4/1986 | Thomason et al. | 340/720 |
| 4,647,916 | 3/1987 | Boughton | 340/724 |
| 4,648,062 | 3/1987 | Johnson et al. | 340/712 |
| 4,656,603 | 4/1987 | Dunn | 364/900 |
| 4,694,406 | 9/1987 | Shibui et al. | 364/518 |
| 4,723,209 | 2/1988 | Hernandez | 364/518 |
| 4,736,308 | 4/1988 | Heckel | 364/518 |
| 4,752,889 | 6/1988 | Rappaport et al. | 364/513 |
| 4,754,326 | 6/1988 | Kram et al. | 364/900 |
| 4,763,356 | 8/1988 | Day, Jr. et al. | 340/712 |
| 4,799,083 | 1/1989 | Knodt | 355/3 R |

Primary Examiner—Raulfe B. Zache
Assistant Examiner—Eric Coleman
Attorney, Agent, or Firm—Fleit, Jacobson, Cohn, Price, Holman & Stern

[57] ABSTRACT

The method of variably displaying search terms includes continuously displaying the names of categories on a video terminal screen. When the cursor is adjacent a category, one data set or search term is displayed, that search term being one of a plurality of terms in a list associated with the particular category. The user displays another term from the list by actuating a scrolling control key input. To select a desired term and move to the next category, the user actuates a select control key input. Therefore, the display system utilizes only two control inputs to select a plurality of terms for a plurality of categories. One list of terms represents control commands that control, among other things, the output of data from the system. One technique of formulating the list is to obtain the data fields from a particular field, corresponding to the category, from all records in a data base. The retrieved data fields are then used as search terms in this dynamically formed list. The terms can also be grouped in fixed or static lists. A routine is used to segment or subdivide the data base search for the dynamic list or to subdivide the static list.

38 Claims, 11 Drawing Sheets

Legal Resource Index available fields are:

| | |
|---|---|
| Article Type | Publication Date |
| Author | Publisher |
| Case Citation | Publication Year |
| Case Name | Special Feature |
| Grade | Statute Citation |
| Journal Name | Statute Name |
| Jurisdiction | Update |

Article Type: _____

Author: _____
_____

Case: ____
_____

Jurisdiction: ___
_____

Journal Name: ___ _____  Publication Year: ___ ____

Procedure: _____

SEARCH SYSTEM WHICH CONTINUOUSLY DISPLAYS SEARCH TERMS DURING SCROLLING AND SELECTIONS OF INDIVIDUALLY DISPLAYED DATA SETS

BACKGROUND OF THE INVENTION

This invention relates to a display of terms, for example, terms used for searching through electronic data base systems, and more specifically, to a method and apparatus for displaying search terms, selecting desired terms and obtaining records from a structured data base. The method and system are preferably applied to data bases that are indexed or formatted but, in a most general sense, it is applicable to any electronic data base.

Historically there are two ways of selecting records from a data base. One is called "command driven" and requires a user to formulate requests for records from the data base by typing instructions or "commands" that are syntactically correct according to the grammatical and spelling rules of the software used to access the particular data base. These rules are often complicated, extremely inflexible and are many times lacking in obvious meaning from the point of view of the user's normal English vocabulary and grammar. As an example, in one system a user might be required to type the term "SEL/na=Brown,*" to select records where Brown appears as the surname of the author, and where the given name is not specified. The software associated with the data base recognizes "SEL" as a search command, "na=" as a command identifying the author field or category in each record of the data base, and "Brown,*" as the search term. In another system, a user is required to type "S au/??Brown" to conduct the same type of search through a second data base, since the command syntax is different than the first software search system.

The second known method of searching through or making selections from a data base, usually called "menu driven", displays syntactically clear phrases describing the choices that can be made in formulating a search in a data base. These choices appear in a column as a list or "menu" of terms on the computer screen. A different menu is used for each decision making category. The user is expected to recognize the term that indicates the procedure he wants executed and type some simple, non-syntactic character to indicate this choice. Usually terms in menus are numbered and the user types the numeric character that corresponds to the chosen term.

In situations where more than one decision needs to be made in order for a particular procedure, i.e., search, to be executed, a choice on one menu may result in the appearance of additional menus that call for additional terms to be selected. Menu driven formats have the advantage of requiring a minimum amount of skill from the user. However, since it takes time for a computer screen to change from one menu display to another, menu driven selection procedures are slow in comparison to command driven procedures when multiple choices are being made. Also, when selections are made from several menus in succession the user may lose sight of or forget what decisions have been made and what decisions or selections could have been made if the decision path had taken a different direction.

The menu driven system can be combined with so-called "pop-up" or "pop-down" windows that display the men selections for an individual category. However, when the number of terms in the menu is great, this type of "pop-up" menu system is impractical due to the limited size of the video display screen. Further, if a large number of categories or fields are involved in the search, the size of the "pop-up" menu is further diminished if the user is to have an unobstructed view of all the categories available for selecting the search terms.

The present invention is an improvement on both command driven and menu driven selection procedures. It is a unique method in that it presents all possible decision making categories at the same time, i.e., simultaneously, and usually continuously on a single computer screen. All search term choices are displayed as meaningful, syntactically correct words or phrases. The invention utilizes any selected search term or search method decision previously made by the user to determine the most efficient order for requesting further input by the user in subsequent decision categories. The user makes selections from one category while having a visual record of choices selected in other previous categories and can change a term previously selected in a category without effecting the other choices or resubmitting earlier search term decisions.

OBJECTS OF THE INVENTION

It is an object of the present invention to provide a method of displaying search terms (or data sets) and requiring the user to actuate only a limited number of control key inputs to select the desired terms and categories.

It is an additional object of the present invention to provide a user-friendly system for displaying a relatively large amount of data and having the user select certain terms or data sets from that data by operating substantially two control inputs.

It is another object of the present invention to provide a system which has a variable or dynamic amount of information to be displayed to the user for the user's further selection.

It is an additional object of the present invention to provide search terms which are formed from data fields found in a plurality of records in a data base and only make those search terms available to the user in the form of a dynamic list to facilitate searching through continually changing data bases or through a data base wherein only a small number of records have information in a desired field.

SUMMARY OF THE INVENTION

One aspect of the invention involves a method and a system of displaying information. Data sets or search terms are grouped in a plurality of lists and each list represents a category or a field in a record in a data base. As used herein, the data base consists of a plurality of records and each record has a number of fields therein. The invention continuously displays a plurality of categorical identifiers for each category and each categorical identifier is related to at least one list. Some identifiers relate to several lists.

The method and system of displaying primarily utilizes two control inputs, a scrolling control and a select control. When the cursor is at one categorical identifier, i.e., is at one category name, a term (or data set) of the unique list associated with that category is displayed proximate the categorical identifier. The user can scroll through the list and change the term by actuating the scrolling control. Therefore, the method sequentially displays, one at a time, terms from the list upon sequential application of the scrolling control. To select the term from the list for that category, the select control is actuated, the cursor moves, and thereafter another category is available for selection of a further term from a corresponding list.

The method and system of displaying terms also includes a control category which is not associated with a field in the records of the data base. The control category is associated with a list of command controls that are selectable by the user with the scrolling control and the select control. For example, control commands such as "give number of records found using the selected search terms", "display present set of records", "quit" or "exit" the display and search and applications program, "clear screen", and "modify selection" from any category or from a particular category are displayable and selectable via the scrolling and select controls The method and system of displaying terms is combined with a method and system of selecting terms such that a search can be conducted through a data base. Lists are classified as fixed or static lists and dynamic or variable lists. The static lists have a set or fixed number of terms therein, i.e., a fixed length, and are derived from expected items in the data base. If the static list is long, the user is prompted to input one or more input characters. If one or more of the input characters match a character string of a term in the static list, a sublist is created by segmenting the static list and displaying only terms matching one or more of the input characters. Only the sublist terms are selectable by the user vis-a-vis scrolling and select control inputs.

The dynamic lists are made by obtaining data fields from each record in the data base wherein the fields correspond to the category selected by the user. The data fields are treated as search terms (data sets) and the terms are displayed and selectable by the user vis-a-vis scrolling and select controls. If the dynamic list is lengthy, the user is prompted to input one or more input characters which are used to segment the search through the records and obtain a sub-set of data fields that match one or more of the characters in the input character string.

Another aspect of this invention is to use static lists which are not search terms but are rather category instruction commands that define the course of the search and that control the order of presentation of decision making categories to the user.

BRIEF DESCRIPTION OF THE DRAWINGS

The subject matter which is regarded as the invention, together with further objects and advantages thereof, may best be understood by reference to the following description taken in conjunction with the accompanying drawings, in which:

FIG. 11 is a flow chart showing a subroutine for segmenting a static list and removing terms therefrom when the length of the static list is too long for the user to efficiently scroll through;

FIGS. 15 and 16 graphically represent the use of the present invention with a data base currently available to the public.

DETAILED DESCRIPTION OF THE INVENTION

The present invention relates to a method and a system of displaying a relatively large amount of data to a user, and allowing the user to select data sets, i.e., terms. Another aspect of the invention relates to using those selected terms as search terms which enable the user to search through the records in and obtain records from a data base.

Each decision making category used in the search of the data base is assigned one or more unique locations on a computer screen. The number of locations assigned is equal to the number of terms that can be selected from all categories. After the term is selected, it is sometimes called herein a "qualifier" since it is used to qualify the search through the data base or identify which of the further categories will be made available to the user.

Figure 1A:
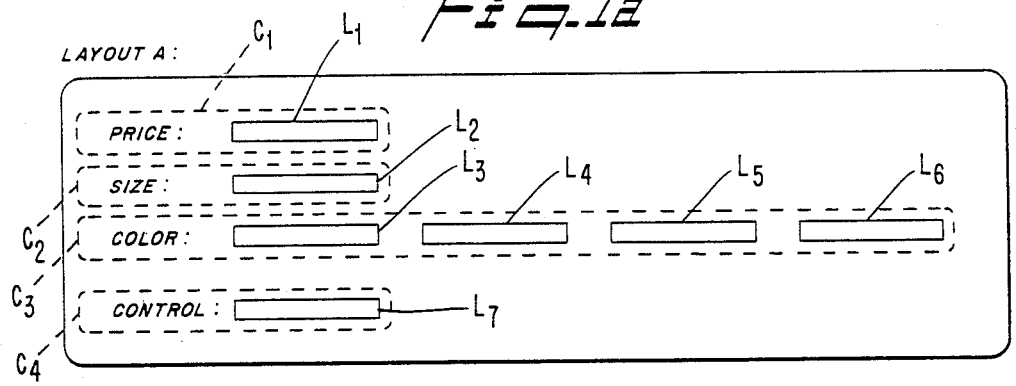
FIGS. 1a and 1b illustrate two video screen display layouts A and B.
Figure 1B:
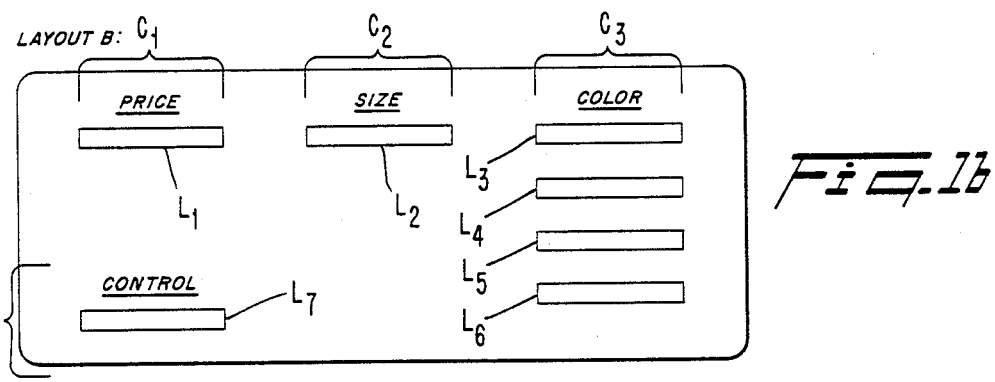

FIGS. 1a and 1b illustrate layouts A and B for a video screen display, i.e., a CRT or video terminal connected to a computer. For example, if records in a data base can be selected (or searched for) on the basis of price, size and up to four color choices, there is one unique location $L_1$ for displaying the variables in the category of Price $C_1$, one display location $L_2$, for the variables in the Size category $C_2$, and four locations $L_3$ through $L_6$ for Color category $C_3$. The positioning of the locations on the screen is not critical. Either of the layouts A and B in FIGS. 1a and 1b would serve for the simple example of displaying price, size and color terms for selecting records having those attributes. The displayed categorical identifier "Price" is intrinsically linked to a list of price terms that are displayed at $L_1$ as are lists for size and color categories.

In addition, each display has a Control category $C_4$ with a display location $L_7$. The categories in FIG. 1a are enclosed by dashed lines, the categories in FIG. 1b are illustrated proximate brackets.

In general, when the applications program of the present invention is initially accessed, the cursor would appear at location $L_1$ for the Price category $C_1$. The category immediately under the user's control is called herein the "currently selected category". The user strikes the scroll control key (which can be the tab key) and a first price or price range appears at display location $L_1$. By repeatedly actuating the scroll control, different prices or price ranges appear at location $L_1$. When the user finds the desired price, he actuates the select control key (e.g., the return key) which selects the displayed term and moves the cursor to location $L_2$, for Size category $C_2$. The user then repeats the operation with respect to the Size category. The Color category is similar except that the cursor would move from display location $L_3$ to display location $L_4$ so the user can select multiple colors for that category. After he user selects a color at location $L_6$, the cursor moves to display location $L_7$ in the Control category $C_4$. At that point the user is displayed one of a plurality of control commands which is selectable upon actuation of the select control key. Other commands are sequentially displayed upon actuation of the scroll control key.

Figure 3:
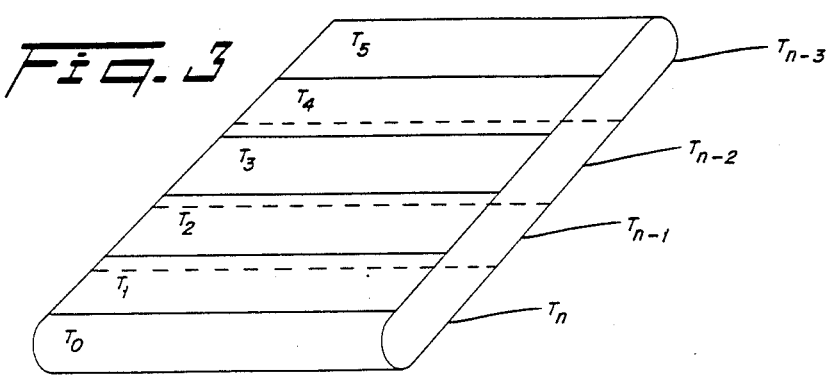
FIG. 3 illustrates the wrap around or circular buffer holding the plurality of terms as one list, terms $T_0$ through $T_N$ being included in the list.

Terms available for selection in any decision making category appear on the computer screen one-at-a-time at their assigned locations. The amount of screen space allocated for each location $L_1$ through $L_7$ must be such that all the characters of the longest term are displayed in the space. The metaphor of a rotating drum or an endless belt, diagrammed in FIG. 3, is one way of visualizing the method wherein terms $T_0, T_1, \ldots T_{n-1}$ and $T_n$ are available to be displayed in one location for a category. This is similar to a circulating storage means or a circular buffer.

Figure 2:
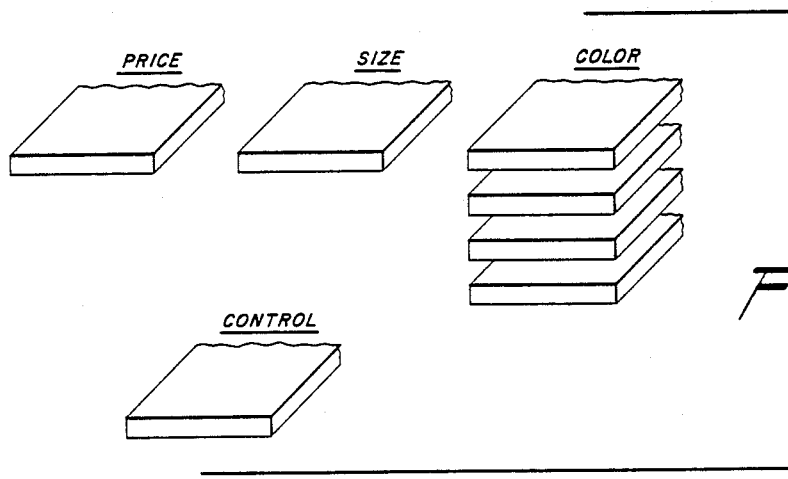
FIG. 2, is a graphical representation of the display method and system wherein one data set or term is displayed but a plurality of terms associated with a like category are disposed in storage "behind" the displayed term.

In the diagram, only term $T_0$ is visible on the computer screen. Other terms in the list can be thought of as being "behind the screen" and this aspect is illustrated in FIG. 2. Term $T_1$ can be "rotated" to the visible position and thus become a candidate for a qualifier (a selected term) by actuating the scroll control key, i.e., with one key stroke. In one embodiment, a reverse scroll control input (e.g., the backspace key) is available that displays $T_n$. Each of these two screen changes is accomplished using one key stroke because each term $T_1$ and $T_n$ is one position away from $T_0$, the visible position. To display term $T_3$, three key strokes are required because $T_3$ is three positions away from $T_0$ in the list. Conceptually, wrap around or circular character string buffer is used to store the list of terms $T_0$ through $T_n$.

If the rotating drum metaphor is applied to Layout B in FIG. 1b, each of the unique locations for the Price $L_1$, Size $L_2$, and Color $L_3$, $L_4$, $L_5$, $L_6$ and Control $L_7$, categories will display one term while other terms in each category remain "behind the screen". This principle is illustrated schematically in FIG. 2 for Layout B.

Figure 4:
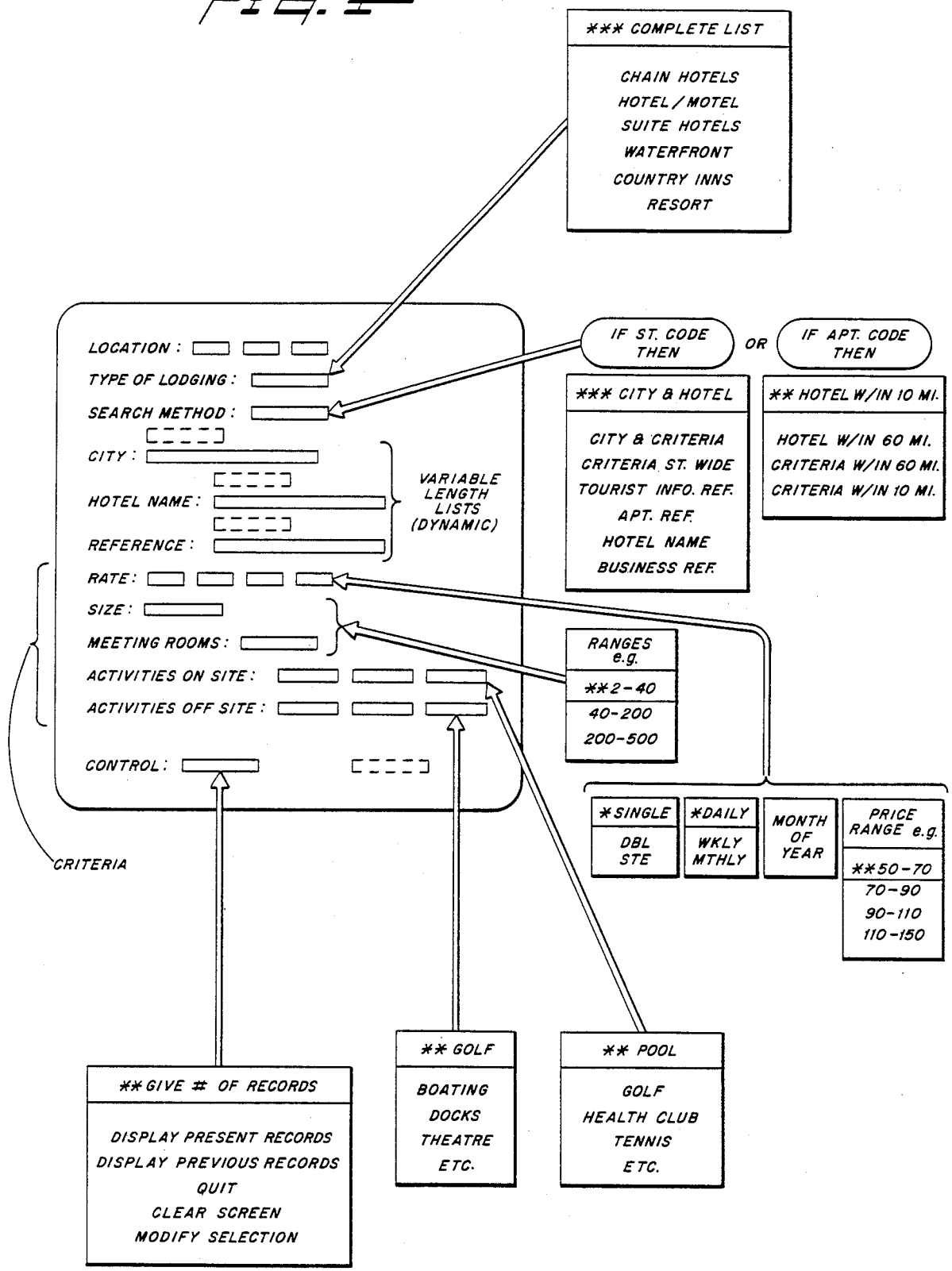
FIG. 4 is a graphical illustration of a specific embodiment of both the method and system of display and method and system of selecting search terms for search through a data base.

FIG. 4 shows a more complicated layout for a specific working embodiment of the invention. In this embodiment, a structured data base of hotel and resort information records is searched and records are selected using any of the following qualifiers or selected search terms: geographic location of the property; type of lodging or resort; exact location; proximity to another location, e.g., larger city; number of accommodations available; number and type of meeting rooms available; price; proximity to specific areas of interest such as a tourist attractions, business locations or airports; kinds of services provided; kinds of recreational activities available on the premises; kinds of recreational facilities available near the location; restrictions and special features of the hotel; and number and type of restaurants. The records also include fields for the name of the hotel, the address of the hotel, the phone number, fields regarding the rate structure for singles, doubles, suites, rates for daily, weekly, monthly, rate changes for the time of the year and the particular rate or range of rates. The major fields in each record correspond to the following categories shown in FIG. 4:

Location
  Type of Lodging
  City
  Hotel Name
  Reference (to airport, tourist attraction and business)
  Rate
  Size
  Meeting Rooms
  Activities on Site
  Activities off Site Each of these categories are shown on the display illustrated in FIG. 4 by a categorical identifier. As used herein, the term "category" corresponds to information displayed and requested or useful to the user. The term "field of data" or "data field" refers to the information in a particular field in a particular record. For example, a record in the hotel/resort data base on the Marriott Gateway Hotel in Arlington, Va. would have a "Hotel Name" field of data representing "Marriott Gateway". This field corresponds to the category "Hotel Name" in FIG. 4. Likewise, the Marriott Crystal City in Arlington, Va. has a Hotel Name field "Marriott Crystal City" which distinguishes that record from the previously discussed record. A further field on the Marriott Crystal City record could be the proximity of the hotel to the U.S. Patent and Trademark Office, also located in Arlington, Va. This field corresponds to the "Reference" category shown in FIG. 4.

Two categorical identifiers, Search Method and Control, are not related to a particular field in the records. The Search Method category allows the user to "jump" to a category other than the next sequentially illustrated category. The Control category allows the user to activate a search routine through the data base with the previously selected terms, to exit the applications program, to modify one of the terms selected in a previous category, and to select other control functions.

In this specific embodiment, the invention is a computer program although the invention as claimed hereinafter is not limited to computer programs. When the program is first loaded or "called up" on the computer and after an introductory screen display is shown to the user, the cursor is immediately to the right of the colon proximate the categorical identifier "Location" in FIG. 4. Since the user in this particular embodiment is usually a travel agent, and since the major desire of the person wishing to reserve a room in a hotel with the assistance of the travel agent most likely has identified the general location of the hotel, the travel agent inputs a two-character state code, e.g., Va for Virginia. The travel agent can enter another two-character state code such as DC, by actuating the space bar and then pressing alpha keys "D" and "C" on the keyboard associated with the video terminal. Alternatively, the travel agent/user can enter a three-character airport code, e.g., "DCA" which is the code that represents National Airport at Washington, D.C. After inputting at least one of these items, the travel agent then actuates the return key (herein identified as -R-) or in some cases the "enter" key on the terminal keyboard. By this action (-R-), the user selects the input character string for the Location category.

The cursor then moves to a location immediately to the right of the colon proximate the categorical identifier "Type of Lodging". Immediately upon that action, the character string "Complete List" appears at that location. As will be described later, the data set or term "Complete List" is the first term in the static or fixed length list in the category "Type of Lodging". This static list is shown in the box to the right of the display screen illustrated in FIG. 4 and a double line terminating in an arrow shows the relationship between the list of terms, the display location, and the category which corresponds to the list.

Certain of the lists shown in FIG. 4 are fixed in length or static lists. However, the number of terms in each list shown has been significantly limited in order to simplify the drawing. The lists associated with the categories, City, Hotel Name and Reference, however, are variable length lists or dynamic lists. These dynamic lists can vary in length and hence may include no terms or may include as many terms as appear in the data fields in the same field in all of the records in the data base.

The term immediately displayed when the cursor reaches a particular display location is shown by asterisks in FIG. 4. This term is separated from the other terms in the list by a solid line. Therefore, with respect to the Type of Lodging category, the term "Complete List" appears first when the cursor is at that display location. For the user to see the next sequential term on the list, the user actuates the scroll control key, herein the tab key -TAB-, and "Chain Hotels" appears at that display location in the place of "Complete List". The user can scroll through the entire list for the Type of Lodging category by sequentially actuating -TAB- to display in sequence: Complete List, Chain Hotels, Hotel/Motel, Suite Hotels, Waterfront, Country Inns, Resort, and return to Complete List. The user can reverse scroll through the list by actuating the reverse scroll control key, herein the backspace (-BKSP-) key. Starting from the Complete List term, the Resort term appears when -BKSP- is actuated. The user selects one of the terms from the Type of Lodging list by actuating the select control key, herein the return key -R-. The program then utilizes the selected term as is described later and moves the cursor to the next category Search Method. Therefore, the user actuates only two keys to select the appropriate term from the list.

The list displayed when the Search Method category is selected depends upon whether the travel agent initially input the two-character state code (Va), or whether the travel agent input the three-character airport code (DCA). If the two-character state code was selected, the term initially displayed proximate the classification Search Method is "City plus Hotel". If the travel agent actuates the return -R- key, the cursor then moves to the City category and, as will be described later, the program or software applications routine formulates a dynamic list of cities in Virginia (if Va was earlier input) from which the user can select a City term. This routine is described in detail later. After selection of a city, the cursor then moves to the Hotel Name category and another dynamic list is formed from the records in the data base from the sub-set of records only having that particular selected city.

If the user/travel agent had scrolled down the static list categorized as Search Method when the state code has been entered to the term "City plus Criteria", the cursor, after selection of the city would have moved to the first display location to the right of the Rate category. The super-category labeled as "Criteria" in FIG. 4 includes the following categories: Rate, Size, Meeting Rooms, Activities on Site, and Activities off Site. Selection of terms from those categories is similar to that described above. Three static lists are associated with the Activities on Site and Activities off Site categories. Each list assigned to one of those categories is similar. The cursor moves from one display location to the next following location immediately to the right. If the user does not want to select a term from the list, each list includes a blank or null data set that can be scrolled to the display location.

The cursor ultimately reaches the Control category wherein the list of control commands is available for selection. Generally, these control commands activate the searching function of the program, exit of the program or allow modification of the previously selected terms. This feature is also described later. The specific features of the invention are described below with reference to FIGS. 1-4.

The Invention from the User's Point of View

The user's objective is to determine which terms in each decision making category are to be used as qualifiers (selected search terms) in a data base search and to rotate those terms to the visible position on the computer screen. A term in the visible position on the screen is, by definition, a displayed term and the displayed term becomes a search term or a qualifier when the user leaves that display location and/or category by actuation of the select control key. No more than three Function Keys are needed to accomplish this display and select task. Control Key #1 moves or scrolls through the list of terms in one direction, which is usually designated as "forward"; Control Key #2 moves or scrolls through the list in the opposite direction called "backward" (reverse scroll); Control Key #3 is used to select the displayed term and to advance the cursor to a different position on the screen. In the example, these Control Keys are assigned as follows:

| | |
|---|---|
| TAB (-TAB-) | to rotate the list forward |
| BACKSPACE (-BKSP-) | to rotate the list backward |
| RETURN (-R-) | to advance to the next position |

The cursor is used to mark the location where the user is making a selection. As the cursor advances to the next location, the user is required to interact with the program in that category.

A list of terms usually includes a null field term or "blank" term as one term in the list. If the user chooses not to select a qualifier in a given category or if there are several locations for one category (see Activities on Site category in FIG. 4 if the user does not want to require further amenities at the hotel), the blank term is scrolled to, displayed and selected by the user.

A location will not display a "blank" as one term in the list if the user is required to choose a term for that particular category in order to search through a particular data base or to interact with the selection process. For example, if price must be specified, in the example of FIGS. 1a and 1b, the Price list will not have a blank term, hence it will not be possible to rotate a "blank" field term to the visible display location $L_1$.

In general, when all terms of interest have been rotated to the visible position (i.e., displayed) and "blank" spaces are in place where qualifiers are not to be used in the search, the records that meet the user's criteria are identified by an appropriate search through the data base. The programming steps necessary to search through the data base may vary from one situation to another. Principally, these steps are determined by the structure of the data base and the preferences of the programmer designing the search routine. Specific techniques of data base management are not encompassed by this invention. However, the method of presenting all possible decision making categories (or at least a large number thereof) at one time to the user and displaying the terms selectable for those categories in a most efficient order is the thrust of this invention. Hence, the invention is considered substantially independent of data storage and retrieval techniques such as indexing, coding or linking fields.

Once the data base records have been searched and the records selected and obtained or made available, the user may read the records, i.e., display the records on the video terminal, transfer them to some other device such as a printer, find out how many records are in the data base that contain all the search terms selected by the user, or perform other operations of interest. If the number of records found is too large due to the selected set of search terms, or too small for a given purpose, the user may choose to change the set of search terms and conduct either a more restricted or less restricted search by modifying the terms. This modification is easily accomplished because all the search terms previously selected are displayed proximate to the category. The general features of the present invention are presented below from the viewpoint of the programmer setting up or structuring the applications program for the ultimate user.

Constructing Static and Dynamic Lists of Terms

Lists of terms are constructed in one of two ways: they are either (1) developed "logically" from what is already known about how the information in a particular data base is classified and used, (called herein "fixed" or "static" lists), or (2) they are built "dynamically" from the data records (dynamic lists herein). Since lists developed logically utilize existing knowledge about the content of the data base, these lists have a "fixed length", i.e., a fixed number of terms, and hence are called "static" lists because they do not change unless the programmer changes the program.

Static lists are constructed from the theory or expectation of the use of the data base. They are prepared in advance of the use of te applications program and do not require an interactive search through the data base as compared to dynamic lists. Static lists may be modified from time to time as the structure of the data base changes by a programmer skilled in the use of the applications program that is the subject of this invention. Nonetheless, these lists are considered static because during the use of the applications program, the list does not change.

For example, using color as a decision making category (FIG. 1a), a list of all color choices can be sequentially displayed and used in selecting records from a data base. A short list would consist of:
Blue
Bluegreen
Green
Red
Yellow Each of these terms is individually displayed upon actuation of the scroll control key, herein the tab key (-TAB-). The terms appear only once at any display location even if there was more than one record with the same color data field. Also, the terms appear even if there are no records having those colors.

The color category list can also be constructed dynamically. A dynamic list consists of all terms that appear at least once in a field in all the records in the data base, i.e., it consists only of data that is obtained from the data base. If at a given time, the color data field only consists of Blue, Bluegreen, Green, and Red, and a new record is added to the data base having a color data field Green, there is no change in the dynamic list that is constructed during the use of the present invention. However, if the Color data field on the new record is Yellow, when the dynamic list for the color category is generated, the term "Yellow" will then appear in the list. In dynamic lists, every term that appears in the list can be found in one record in the data base because the terms in the list correspond to the particular data fields extracted from the presently available records. In a sense, the data fields are converted from information fields to search terms available for selection by the user.

Decisions to use static or dynamic lists for decision making category in any particular data base search are made on the basis of the advantages and disadvantages of each kind of list. Static lists anticipate all choices even if there are no records that satisfy the choice at the time the list is constructed. They do not require a search of the data base to produce the list of terms, i.e., the list is not interactively formed in conjunction with the data base. Dynamic list present only terms that have at least one corresponding record. Dynamic lists give an accurate, up-to-date list of terms that actually appear in the data base. For extremely large data bases or ween search capability (such as hardware, software, speed or cost) is limited, static lists may be more efficient because the search time to develop the dynamic list may be lengthy. However, if the search capability is adequate (or if the data base is small), dynamic lists may be preferable because at least one "hit" or record is always available. Further, if the data base is continually changing (if the merchandise in a particular color readily sells out) then dynamic lists may be preferable because the buyer of the merchandise is more concerned with availability of the product. It may also be preferable to allow the user to choose whether a dynamic list or a static list is appropriate for a particular category; however, this assumes a relatively sophisticated user who understands the distinctions between static and dynamic lists.

Presenting Lists of Terms

There are several refinements to increase the efficiency of the presentation of long lists by minimizing the number of key strokes (-TABs-) necessary to scroll through a list of terms to display the desired term on the screen, i e., to move the term to a visible position on the screen.

Taking Previous Decisions into Account: The list of terms that is presented at any display location on the screen is either a static or dynamic list. It may be the entire list available for that location or, depending on previous decisions or a required character sting input, it may be a subset or a segment of terms on the list.

A portion of the list will be presented at a location if earlier selections indicate that only some terms in a list are valid choices. For example, a product for sale in a merchandise data base may be available at $20.00, $15.00, $10.00 and $5.00 in Blue, Bluegreen, Green, Red and Yellow but Blue and Green products are the only ones available at $5.00. If the lists are dynamic and a Price term has been selected, the list for color will be determined by the price that has been chosen. Thus, if the user selects $10.00 as a qualifier, all five colors will be rotated at the price location (because all five colors are available at $10.00); however, if the user selects $5.00 as the qualifier, only two colors, Blue and Green, will be rotated at the Color location. Similarly, if the user selected color first, $20.00, $15.00, $10.00 and $5.00 is rotated if Blue or Green were chosen as qualifiers, but only $20.00, $15.00 and $10.00 are rotated at the Price location $L_1$ (FIG. 1a) if Bluegreen, Red or Yellow is selected.

Length of Lists: Lists of terms can be divided into parts or segments. Using only a segment of a list in a rotation increases efficiency of the selection process in situations where there is a high probability that the desired term appears somewhere in the identified segment and a low probability that it appears anywhere else in the list. That is, out of all possible terms $T_s$, a segment, $t_s$ is identified for rotation if there is a high probability that the desired term $T_x$ will be found in segment $t_s$. Segment $t_s$ is a subset or sublist of list $T_s$.

For example, if a list consists of proper names in alphabetical order, a segment may be defined as all names starting with the same first letter. If the user is looking for the name "Holiday" (FIG. 5), all H's in an alphabetic list of hotel names is the list segment. The list segment is also called a "sublist" herein. In this case the terms that are "held behind the screen," but can be rotated or scrolled to the visible position, are limited to those which start with H.

To segment the list, the user is prompted to input a character string. Herein, the term "character string" means one or more keyboard characters which can be alphabetic, numeric or otherwise. After inputting the character string, a match between one or more of the characters in the string and the terms in a static list is found. For dynamic lists, the input character string is used to limit or focus the search through the data base while forming the dynamic list. The term "search limiter string" describes this type of input character string herein.

If the user mistypes any letter beyond the first letter of the input character string, the program can be designed as shown below to list the correct name somewhere in the list segment. Perhaps the desired hotel name starts with "Hal" instead of "Hol", if an H list is used to form the list segment, the user can scroll through the H list to find the desired term without examining the names that start with some other letter.

When the applications program of the present invention is first implemented for any data base, theory and experience with other data bases are used to determine whether a categorical list will be segmented. Important characteristics to consider are: (1) length of lists, (2) organization of lists, and (3) expected error patterns of the users. In the above example of names in alphabetical order, the probability of making an error in the second letter, which is a vowel, is much greater than the probability of making an error in the first letter. Therefore, it is useful to put all the "H" names in the segmented list of hotel names and therefore allow the user to scroll through that list. If the sublist of H Hotel Names was very long and if the users are skilled typists and familiar with the spelling of the terms that appeared in the lists, the decision to segment on the basis of the first two characters of the input character string might be made.

If the user/typist is very skilled, they may be expected to correctly type all the letters of a desired term as an input string. This may be preferable if a record included data field having a textual abstract of an article (the subject of the record). In that case, the data base supplier expects the user to search the abstract using key words. The static list would include all key words. The user would be required to input almost a complete key word as a character string to segment the key word list. For example, in a legal data base including court decisions, the user inputs "contract" and the segmented list includes all the key words that have "contract" in their phrases. Based on the narrowed sublist, the user scrolls through the list to identify and select one or more key word phrases. The sublist could be used at multiple display locations to facilitate formation of a string search command. The multiple key word phrases can be logically connected together via selectable logical operators such as "and" or "or". When the string search command is fully formed, the textual abstract is searched using the string command and an appropriate number of records are found and reported.

As a data base is actually used, actual error patterns and selection patterns can be used to improve the efficiency.

Order of Lists: The system or program operates more efficiently if the lists of terms are ordered alphabetically, numerically or chronologically because, if the user can logically predict the position of a desired term in a list being "held behind the screen", the term can be easily displayed by scrolling forward (-TAB-) or backward (-BKSP-) through the list.

When there is no inherent linear or logical order to lists, each list is ordered according to the probability that a particular term is the desired term. The most likely term is initially displayed as $T_0$, the second $T_1$, third $T_2$, the fourth $T_3$ and fifth $T_5$ assuming only a forward scrolling control.

Determining the First or Starting Position: Efficiency is increased by identifying the term that holds the highest probability of being the desired term and displaying it first in the visible position, with the other terms in the list or list segment held "behind the screen", ready to be rotated forward if need be. For example, if the user inputs the character string Hol in response to the prompt at the currently selected category of Hotel Name, it is more probable than not that those three letters are the correct ones (see FIGS. 4 and 5). Therefore, in a list that is segmented to hold all H Hotel Names, the first name starting with Hol is initially displayed on the screen. When the term is correctly predicted, no scrolling key strokes are necessary, because selection of the term is made by actuating the select control (return (-R-)) and the cursor moves to the next category.

Figure 5:
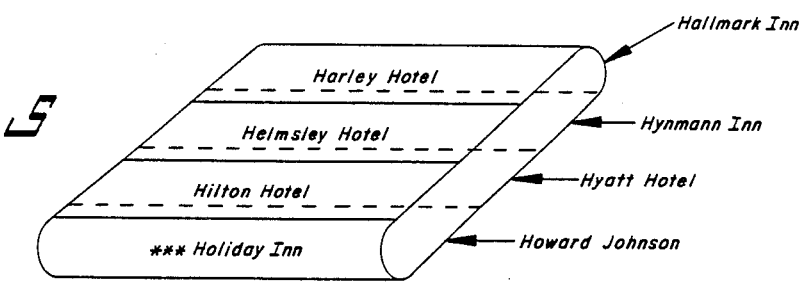
FIG. 5 is a representation of the wrap around character buffer holding the search terms identifying hotels in a list associated with the category Hotel Name in FIG. 4.

Preferably, the term that appears first in the list is marked with a symbol such as [] or *. If the user does rotate the list, recognition of the starting position is provided by the symbol. This is shown in the static lists of FIG. 4 and in the segmented list in FIG. 5. If the user indicates that the term should start with "Hol", the term "*Holiday Inn" is first displayed. Using the rotating drum metaphor, it will appear on the screen as illustrated in FIG. 5.

Required User Input Fields: Each category that is segmented and/or has a starting position determined by the user requires an "input field" as well as a unique display location on the screen for displaying the input. This is shown in FIG. 4 by the dashed boxes immediately above the dynamic list display locations for City, Hotel Name and Reference categories. By requiring the user to type in an input character string, the segment and/or the starting position of the list or segment is found. The details of this subroutine are discussed with respect to FIGS. 9, 11 and 12. The positioning of the input field on the computer screen is not critical. For instance, the input field may be immediately above the coordinates of the display location for the list that the input will influence or it may be at the same coordinates. As an alternative, the input fields may also be grouped along the top or bottom of the screen so that the user inputs all required information before any of the lists or segments are displayed. Of course, input fields can be associated with static lists as well as dynamic lists.

There are two situations in which the characters input by the user in the input field cannot result in a starting position and/or segment that is exactly what the user expects. Assume N letters are input as a character string. In one case, the list does not contain a term starting with all of the N letters typed. For example, the user might type Hol, to identify a starting position in a list that has terms starting with Ha and Hu, but not Ho. In such situations, a segment is generated that starts with a term having as many characters as can be matched to the input character string. The segmented list would start with Ha since only H matched. Further, to give the user some kind of "feedback" to explain why the initial term that appears is different than what was requested; a message or prompt appears at the bottom of the screen stating: "No segment found starting with Hol. This segment starts with Ha".

In the second situation, none of the N characters input by the user match any term in the list. For example, the user inputs Hol to identify a starting position in a list where there are no terms starting with H. In this situation, the program either selects some starting position or segment that is logically prior to the input string and gives the user feedback similar to the prompt described above or, depending on the structure of the list, the program may direct the user to input a further or a different character string in the input field. In the latter case a second feedback statement is presented on the screen which instructs the user to input different characters. It may say "No segment starting with H. Identify a new starting position."

Required Control Line: Most locations on the screen display static or dynamic lists containing terms that specifically refer to the data base. However, one static list, positioned at or near the bottom of the screen in FIG. 4, is needed to give the user control over the applications program. At a minimum, this list is a Control Command list that allows the user to exit the program or execute the search. More realistically, it gives the user several choices of how to proceed. The following kinds of control commands are considered typical of those that appear on the required control line:

*** Give Number of Records
Display Present Records
Display Previous Records
Quit
Clear Screen
Modify Selection In this example, these terms have the following meaning:

| | |
|---|---|
| Give Number of Records | Display a count of the number of records that satisfy all the displayed and selected terms (i.e., qualifiers) that are now shown on the screen |
| Display Present Records | Display the records that satisfy all the qualifiers that are in the visible position on the screen |
| Display Previous Records | Display the records that satisfy all the qualifiers shown on the screen before the most recent modification of the qualifiers |
| Quit | Exit from the applications program |
| Clear Screen | Remove all the displayed terms or qualifiers from the screen and allow the user to begin again (reinitialize program) |
| Modify Selections | Allow the user to change some or all of the terms or qualifiers beginning from a predetermined location |

Figure 6:
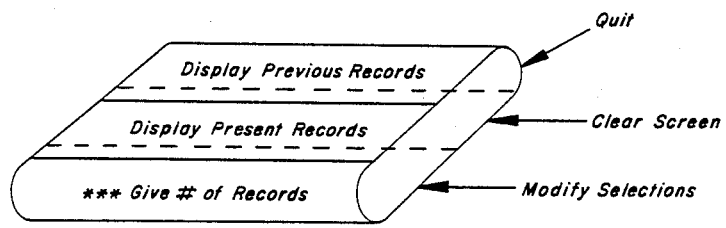
FIG. 6 is a representation of the wrap around character buffer showing the control command list illustrated in FIG. 4.

At its assigned sequential position in the Control Command list, "* Give #of Records" appears initially on the screen because it is the most often selected term. As described above, the "*" identifies the first displayed term. The two next most often selected terms are Display Present Records and Modify Selections so they appear in the $T_1$ and $T_n$ positions. Each takes one key stroke to be brought to the visible position of the screen (either (-TAB-) or (-BKSP-)). Quit, the term least likely to be selected, is the farthest from the starting position and would take the greatest number of key strokes to be brought to the visible position on the screen. An illustration of the rotation concept is schematically shown in FIG. 6.

The Required Control Line can give choices that are different than the ones discussed above. For instance, instead of an option to modify beginning from one location on the screen, there could be separate options to modify terms at specified categories. The terms could be "Modify Name", "Modify Address", et cetera. If the categories were numbered, the terms could be "Modify 3", "Modify 4", et cetera could be used.

Optional Control Lines: There may also be one or more Optional Control Lines, usually at or near the top of a computer screen. Optional control lines may indicate how terms are to be combined to search through a particular data base. All Control Lines, whether required or optional, are static lists. The exact organization of such lists is based upon the data retrieval methodology for the particular data base being searched. The terms can be written so that the user can choose to have the program skip some categorical locations if the qualifiers or terms at those locations are antithetical or contradictory to other terms. For example, in FIG. 4, there is a practical reason for deciding that hotels must be selected either by their proper name or by their physical characteristics such as size and building type (but not on both). The secondary or optional Control Line is the Search Method category that specifies those choices so that the user must select a decision path from the list. Two of the terms available for display on the secondary control line, Search Method, are City & Name of Hotel and City & Hotel Criteria.

If the user selects the first term, the program moves the cursor to the City category, requires the user to select a city search term, moves the cursor to the Hotel Name category and requires an input selection but the program will not allow the user to identify a hotel by its physical characteristics, i.e., rate, size, etc. Conversely, if the city and hotel criteria term is selected as the qualifier, the user will select city and rate, size, meeting rooms, etc., features but the user is not allowed to select a Hotel Name term as a qualifier.

The Optional Control Line can also be used to have the program link qualifiers or search terms using any of the three logical connectors: "or", "and" or "not". Examples of control terms that link qualifiers are given below. The substantive terms are taken from the list of terms describing members of a professional legal organization.

Professional Membership or Professional Rating
Most Recent Degree and Years Experience
Specialty, not Employed by One Client Here, if the first term is selected, the user is required to identify members by either the professional groups, e.g., American Bar Association, which they are a member of or the rating that they have been given by a professional rating system, e.g., by Martindale & Hubbel. The second term demands that the user identify members by the their most recent academic degree and the number of years of experience. The logical connectors are underlined above. The last example given indicates that members are identified using the name of their specialty so long as they are employed by more than one client.

The above example assumes a structured data base listing members of a large professional organization. Qualifiers could include the following: name of member; city and state where profession is practiced; name of firm where employed; name of undergraduate college and degrees awarded; name of graduate school or college and degrees awarded; most recent degree; date of most recent degree; name and date of most recent continuing education session attended; specialty of member; specialty of firm where employed; size of firm where employed; rating given member by professional colleagues; rating given firm where employed; number of years in profession; names of key clients; et cetera.

If a secondary Control Line is used, the cursor will not necessarily move consecutively from one location to another. It may skip some locations or go to a location near the bottom of the screen and then to one closer to the top of the screen. When this is done, the program moves the cursor past the locations that are not relevant and does not allow any selection to be made in those categories.

DESCRIPTION OF ONE EMBODIMENT OF THE INVENTION

Figure 7:
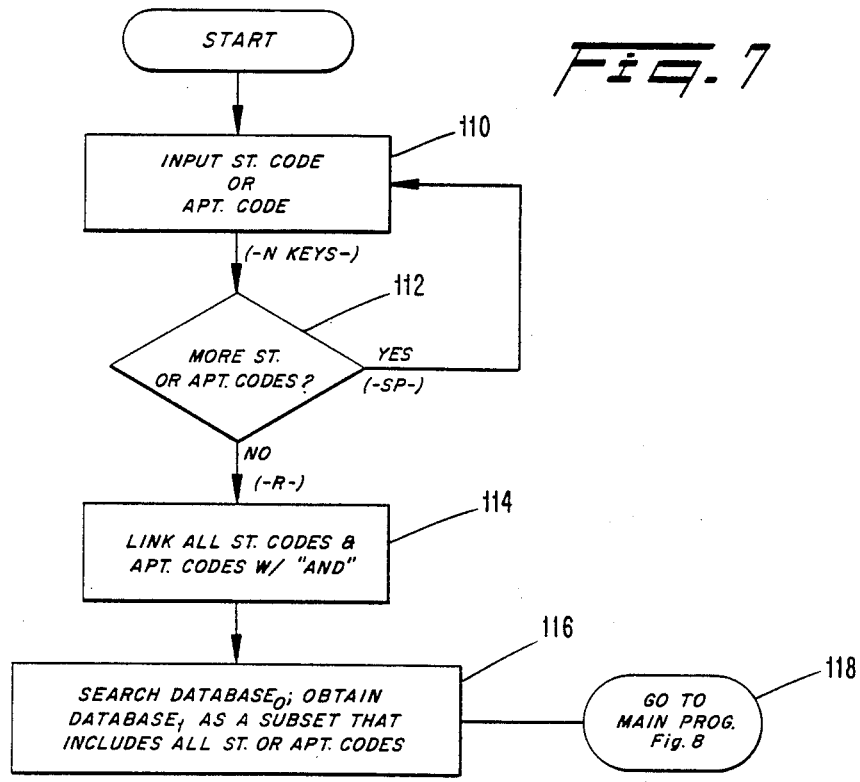
FIG. 7 is a flow chart illustrating the initial steps in the specific application of the invention.
Figure 8:
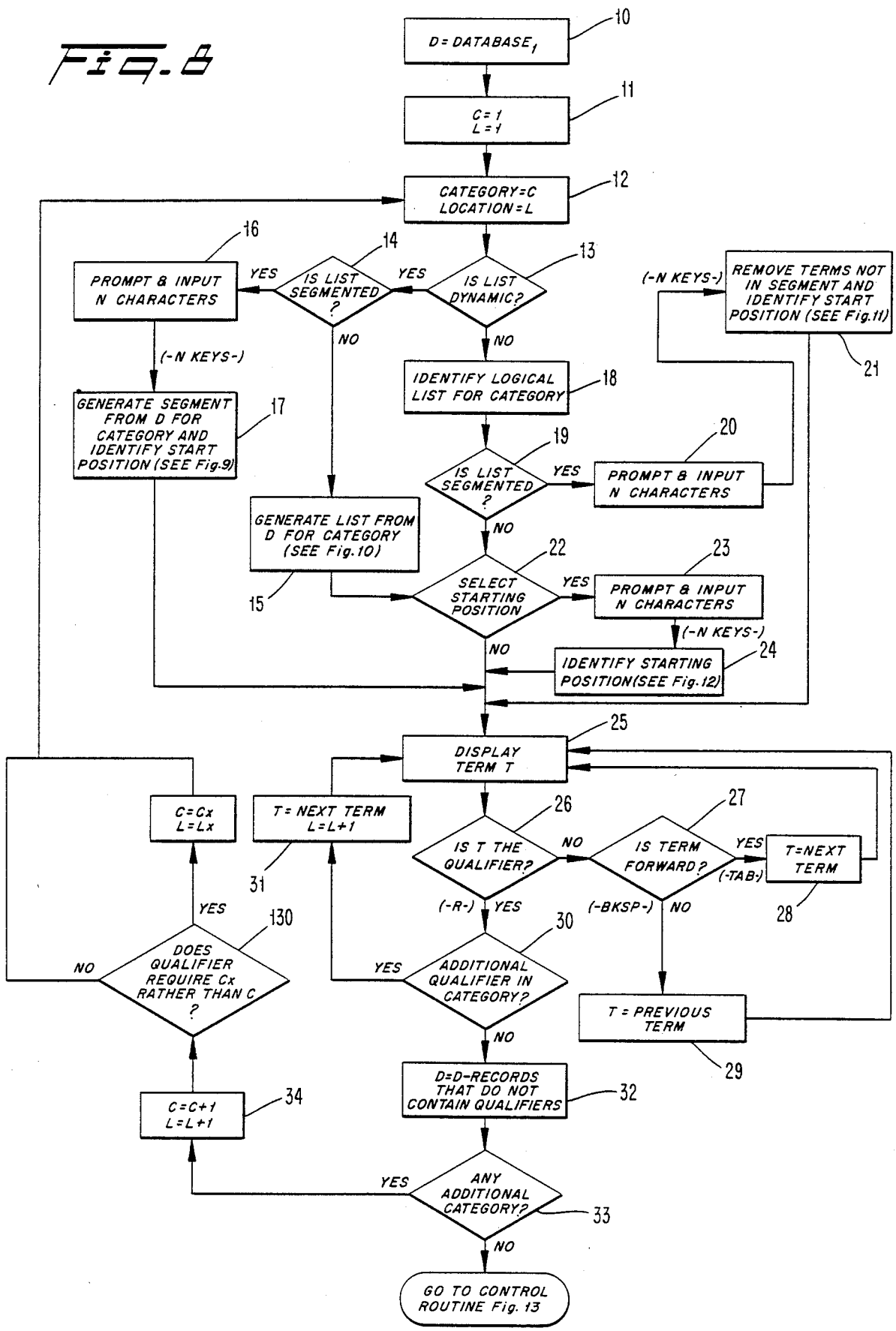
FIG. 8 is a flow chart showing the steps of displaying and selecting terms per the present invention.
Figure 11:
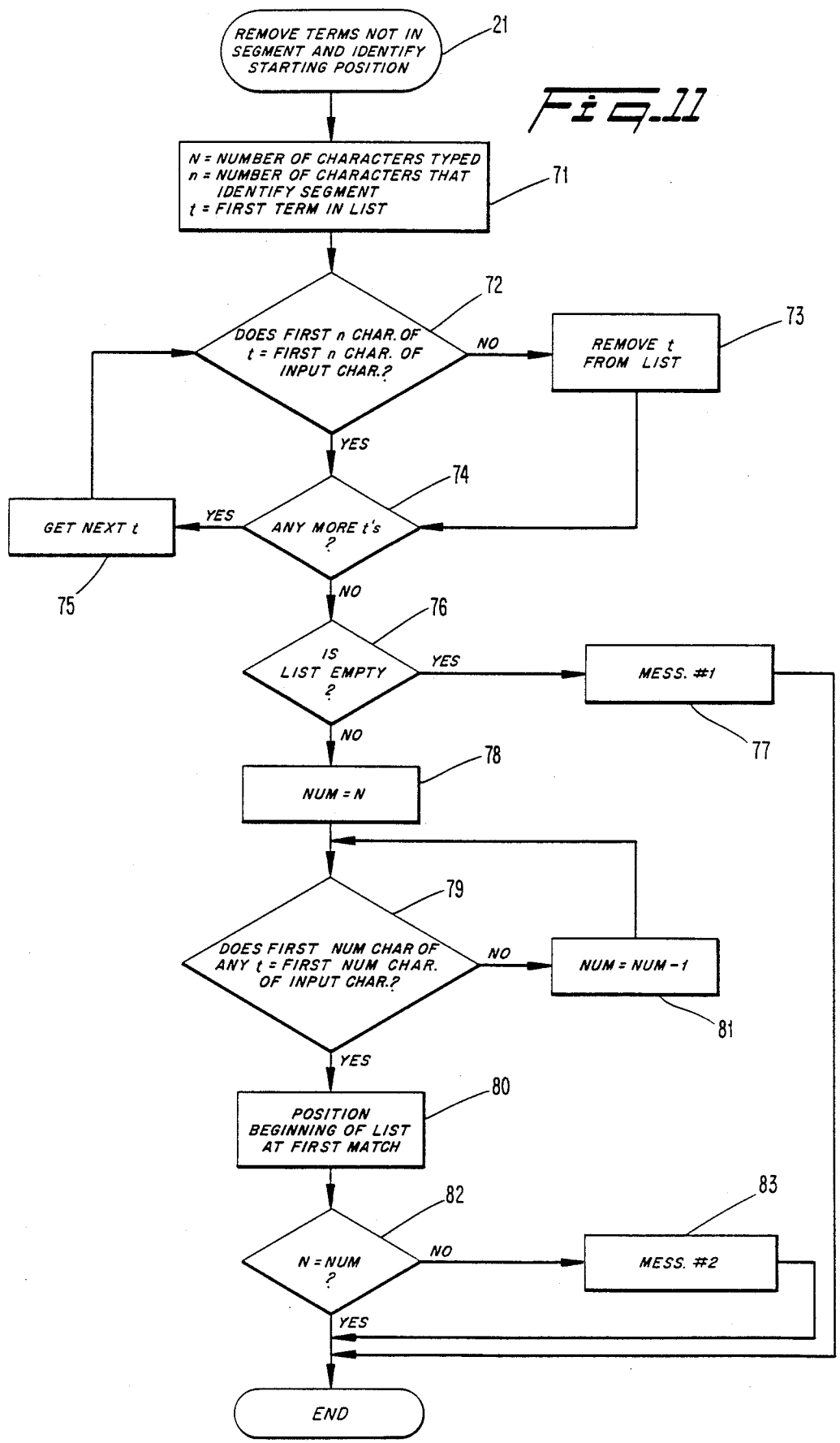
Figure 12:
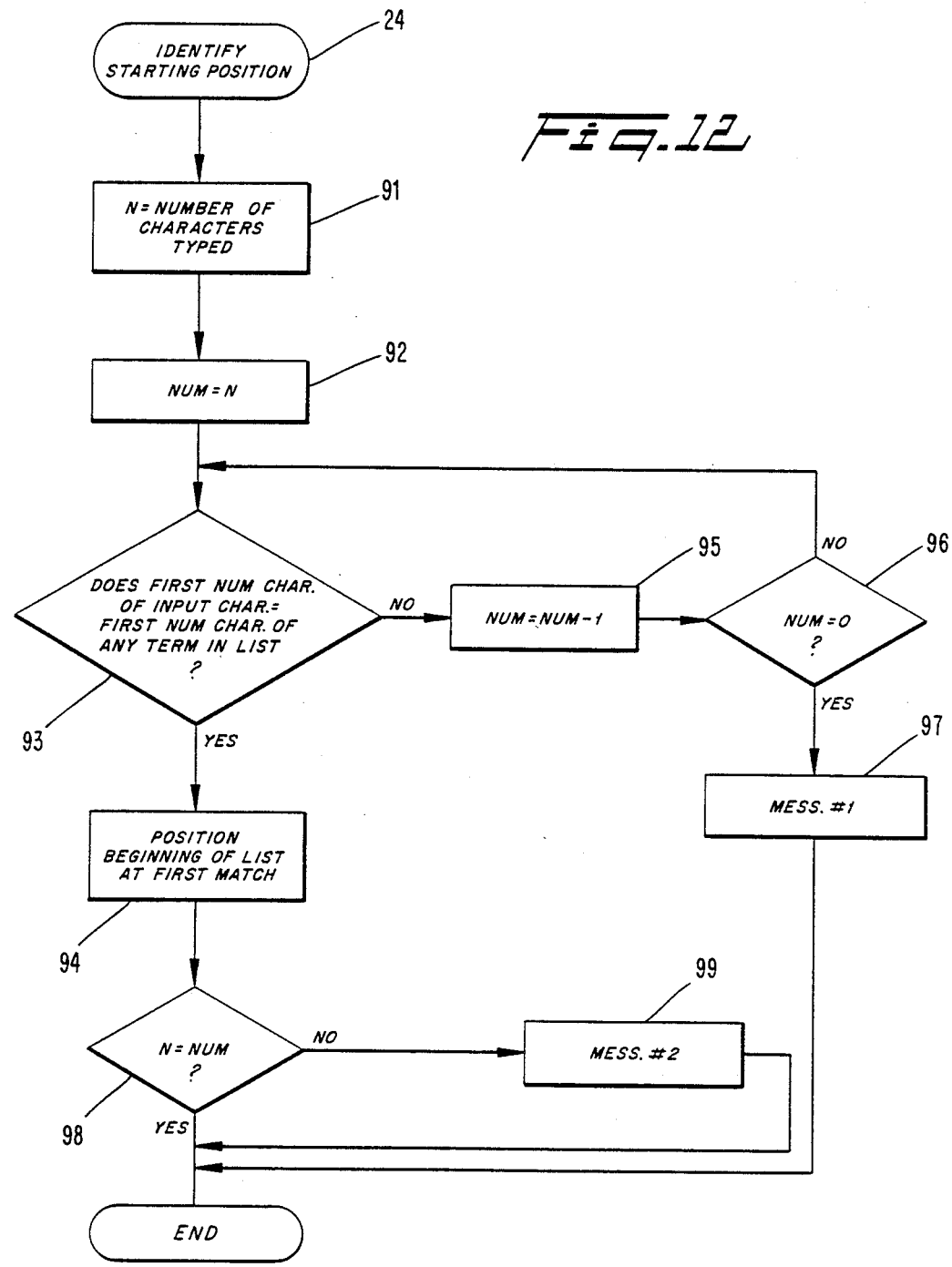
FIG. 12 is a flow chart of a subroutine showing how to identify the first term to be displayed.
Figure 13:
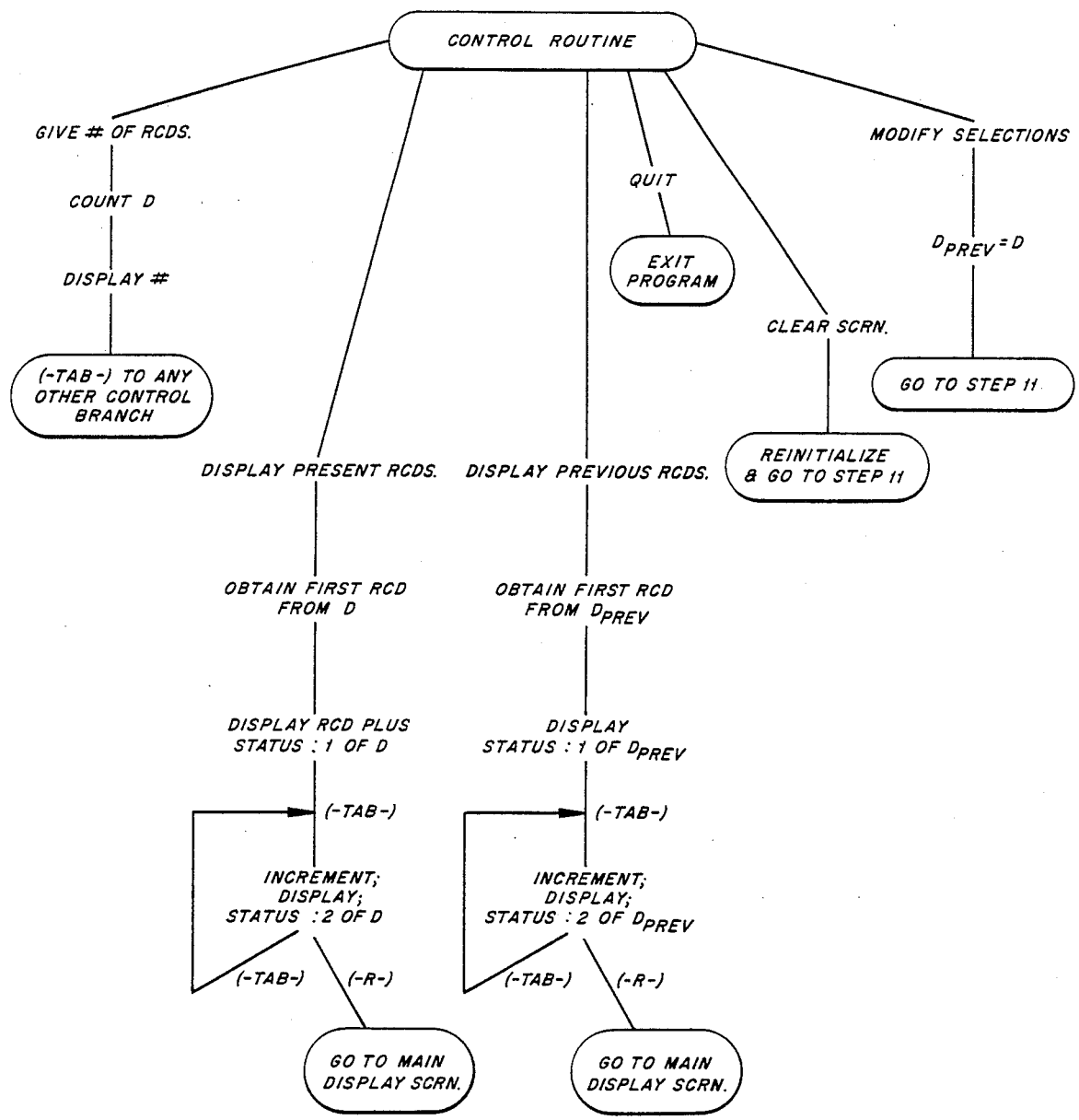
FIG. 13 is a flow chart in a D flow chart format showing the control routine for the particular application of the method and system of the invention described with respect to FIG. 4.
Figure 14:
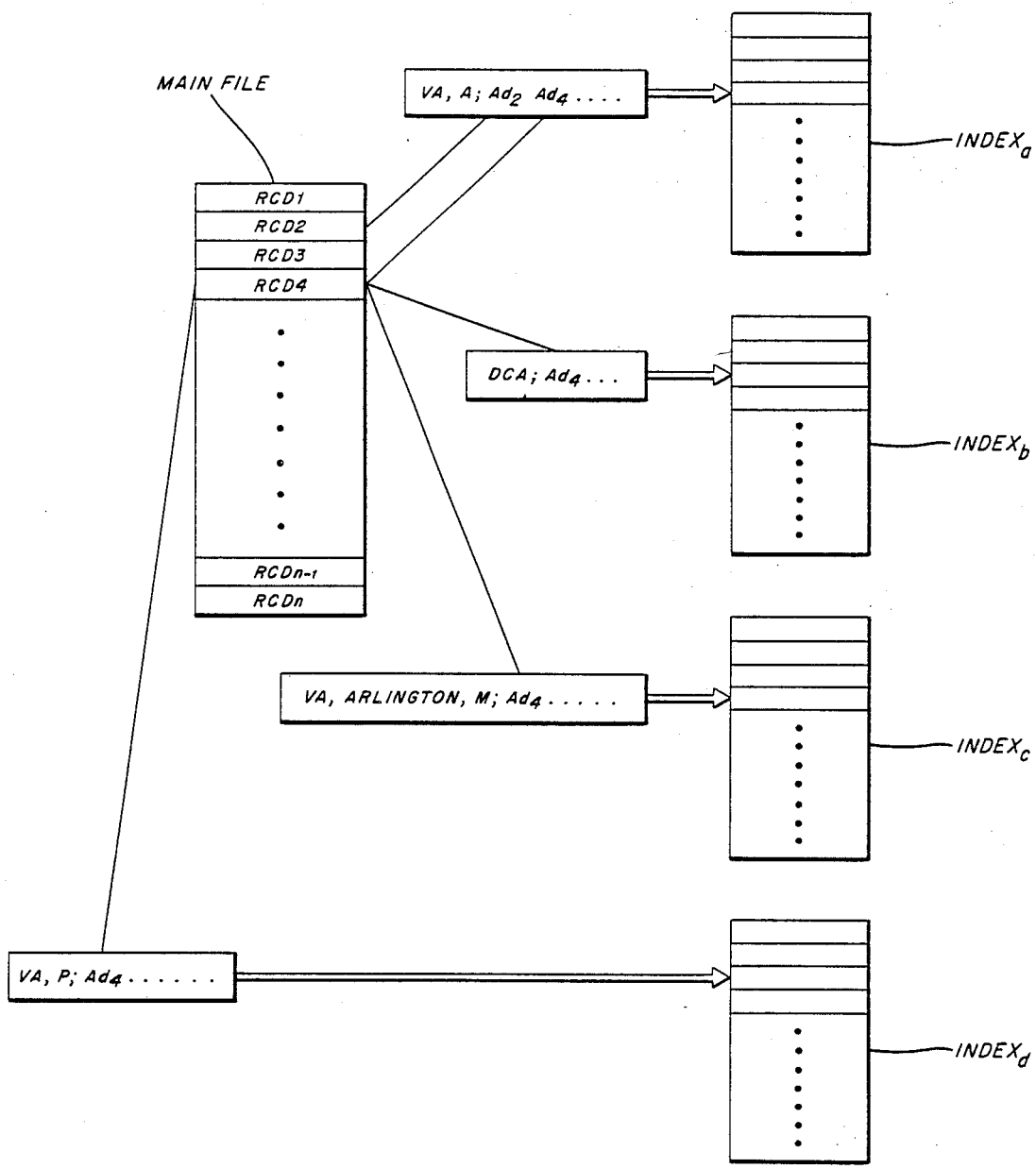
FIG. 14 is a graphical representation of the data base used in conjunction with the specific application of this invention.

The following is a description of one embodiment of the applications program of the present invention. In general, FIG. 7 shows a flow chart for the initial steps of this program which is unique to the hotel data base described earlier. FIG. 8 is a flow chart that is generally applicable to many embodiments of the present invention. FIGS. 9, 10, 11 and 12 are flow charts showing various subroutines which increase the efficiency of the applications program in accordance with the principles of the present invention. FIG. 13 is a D type flow chart showing the control routine for the particular hotel data base embodiment. FIGS. 7-13 are associated with the display shown in FIG. 4. FIG. 14 illustrates the data base structure of the hotel data base provided as an example herein.

FIG. 7 depicts a flow chart of the initial steps involved in one embodiment of the present invention. As discussed above with respect to FIG. 4, the cursor initially is proximate the Location category. The user is prompted to input either a two character state code (e.g., VA) or a three character airport code (e.g., DCA) in step 110. After the user has input the two or three character string, shown in the flow chart as (-N Keys-), the user can either actuate the space bar (-Sp-) or actuate the enter or the return key (-R-). The decision step 112 reflects the user's actions. Herein, when the user must provide some input into the applications program, the flow charts designate the -N keys-, or some type of control input such as -R-, -TAB-, or -BKSP-.

In step 114 all the state codes or airport codes are linked with logical connectors "and" and in step 116 a search through the data base (shown as Data Base$_0$) is conducted to obtain Data Base$_1$ as a subset of Data Base$_0$. Subset Data Base$_1$ includes all the records having the unique state or airport codes. Step 118 simply shows the interconnection between the flow chart illustrated in FIG. 7 and the flow chart illustrated in FIG. 8.

In FIG. 8, step 10 indicates that the method begins with an existing data base, Data Base$_1$, and variable D is set to Data Base$_1$. The Category Counter, C, and the Location Counter, L, are initialized to 1 in step 11. The currently selected category (i.e., the category under the user's scrutiny) is defined by variable C and the current display location on the computer screen is defined by variable L in step 12.

For ease of understanding, FIG. 8 beginning with step 13 is analyzed in two parts. The first part, from steps 13 to 24, describes four different paths that may be used to identify the term that is to be displayed on the computer screen. The second part, from steps 25 to 33, describes how the user selects a term or qualifier from the available terms in the list and how the applications program advances to the next Category and to the next Location as needed.

Figure 10:
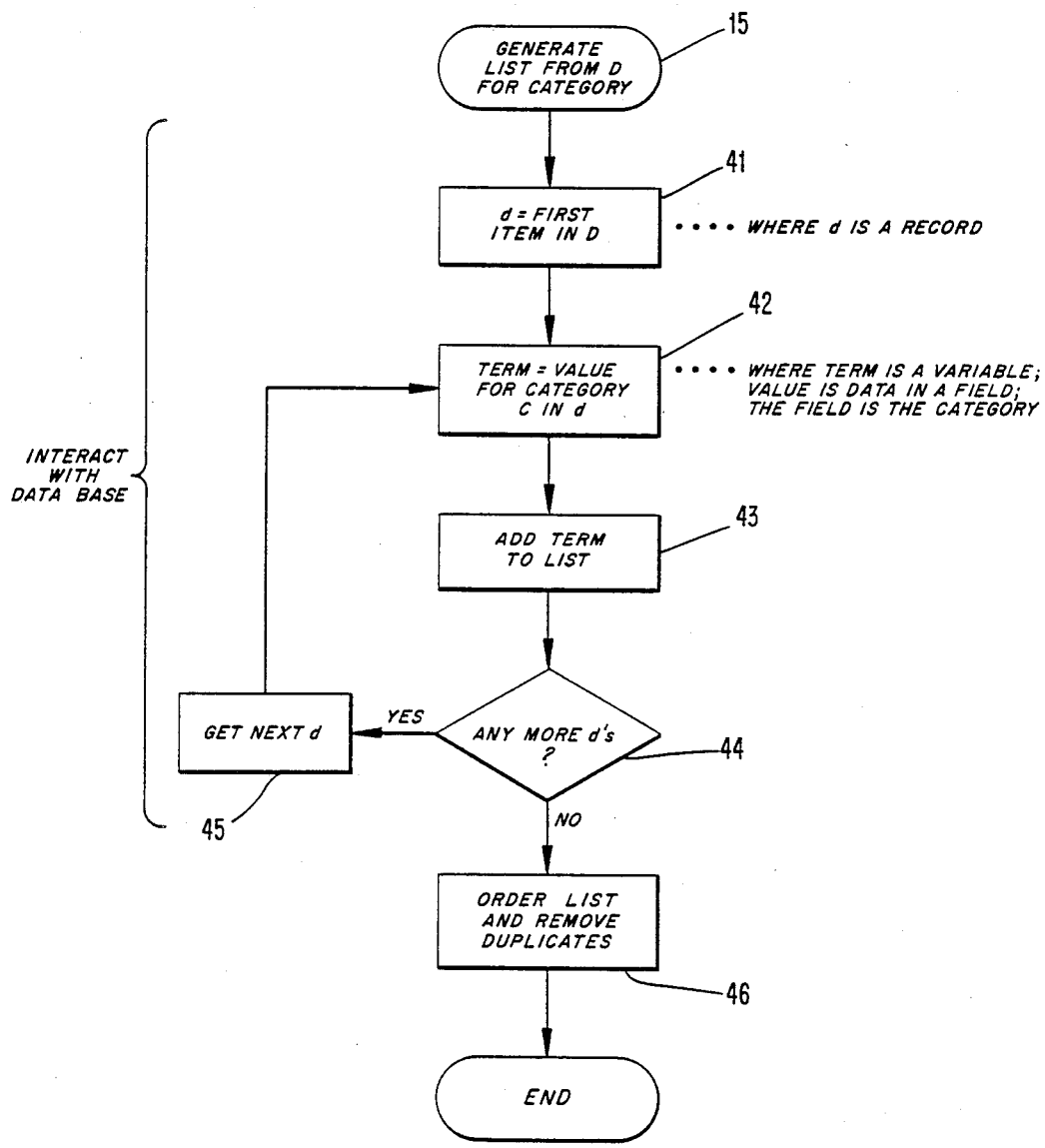
FIG. 10 is a subroutine showing the steps for obtaining a dynamic list from a data base.

Identifying the Term: The first decision step 13 determines if a dynamic list is to be used. If the list is dynamic, it is determined if the list is to be segmented in step 14. If a dynamic list is not segmented, he program identifies and orders all possible terms that can be selected for that Category from the data base in step 15. FIG. 10 presents the detail of this subroutine and is discussed later. Next, it is determined if the user is to select the starting position of the list in step 22. If that is the case, the user inputs N characters of an input character string into the designated input field on the screen in step 23 and that information is used to identify the term that is to be initially displayed in step 24 and displays that term at the appropriate location in step 25. FIG. 12, described later, sets forth the subroutine in step 24 in greater detail. If the user does not need to select the starting position of the list per decision step 22, the first term in the list is displayed in step 25. This completes the term identification procedure for non-segmented dynamic lists.

If a dynamic list is to be segmented per step 14, the user inputs N characters of an input string in at the designated input field in step 16. It should be noted that the program and not the user determines the decisions in steps 13, 14, 19, 22, 30, 33 and 130. Decisions in steps 13 and 14 are based on the specific category under consideration. For example, if the data base is changing rapidly, a dynamic list is used for a particular category. This selection is the programmer's choice and not the user's. Likewise, if the list is long, the list is segmented per the programmer's discretion.

Using the N input characters supplied by the user in step 16 (note the -N keys- designation), the program identifies and orders the appropriate segment of all possible terms that can be selected for the Category from the data base and identifies the starting position of the newly formed dynamic list in step 17. This is explained in further detail with respect to FIG. 9. The first term is then displayed at the appropriate location on the screen at step 25. This completes the term identification procedure for segmented dynamic lists.

If it is determined that a dynamic list is not being used in step 13, the program identifies the appropriate static list for that Category in step 18 and determines if the list is to be segmented in step 19 based on the particular category. The fixed or static list is stored in memory. If the list is to be segmented, the user types N input characters in the designated input field at step 20. The program then removes terms from the static list that do not match at least one character of the N input characters in step 21 and displays the first term in the visible position on the screen in step 25. FIG. 11 describes step 21 in greater detail. This completes the term identification procedure for static lists that are to be segmented.

If it is determined that the static list is not to be segmented in step 19, it is then determined if the user must select the starting position of the list in step 22. If the starting position is to be selected, the user types N input characters (step 23), which are then used to identify the first term (step 24) to be displayed in the visible position of the screen (step 25). FIG. 12 describes step 24 in greater detail. If the starting position is not to be selected by the user (step 22), the first term in the static list is displayed at step 25. This completes the term identification procedure for logical lists that are not segmented Selecting the Term: In summary, one term from a list or segment of a list for a particular Category, selected using one of the four decision paths described above, is displayed in the visible position at a particular Location on the screen (step 25). The user then determines if the displayed term is the desired term or desired qualifier (step 26). If it is not, a decision is made to examine the terms held "behind the screen" to find the desired term or qualifier (step 27). If the term is likely to be in the "forward" direction in the rotation, the user types the forward scroll control key (-TAB-) that rotates the list of terms "forward" and the next term is displayed on the screen (step 28). If the user determines that the qualifier is likely to occur in a position that is "backward" in the rotation, the user types the reverse scroll control key (-BKSP-) that rotates the list of terms in the opposite direction and the "previous" term is displayed on the screen (step 29). When the displayed term is the desired term or qualifier (step 26), the user actuates the select control key (-R-) and selects the term.

Thereafter, the program determines if another list of terms should be presented for the same Category or if additional terms from the same list should be presented for the same Category (step 30). If so, the first term in the new list or the next term in the old list is displayed at the next location on the screen (step 31) and the process of selection begins again. For example, in FIG. 4 there are three locations for desired terms in the category of "Activities on Site". However, the same static list is used for all the display locations and, in one embodiment, when the first term is selected, the next term displayed is the term sequentially following the first displayed and selected term. Alternatively, since the user only selects Pool, Golf and Tennis terms once, the same list is used and the program simply deletes or makes unavailable the previously selected term.

When all qualifiers have been selected for a particular Category, the program searches through the Data Base$_2$ (in the first instance), excludes records that do not contain terms chosen for that Category (step 32), thus reducing the number of records being considered, creating Data Base$_2$ as a subset of Data Base$_1$ and setting variable D equal to Data Base$_2$. The program then determines if there are any additional Categories to be used in the selection process (step 33). If there are, the method advances to the next Category and advances to the next Location on the screen (step 34) and the process begins again. Otherwise, step 130 determines if a particular category $C_x$ has been dictated by an Optional Control Line, e.g., the Search Method category in FIG. 4, and then sets C equal to $C_x$ (and $L=L_x$). For example, if City and Criteria were selected (FIG. 4) the next selected category is City, then the following category is Rate wherein the Hotel Name and Reference categories are jumped over.

If no additional categories are to be currently selected per decision step 33, the program jumps to the Control Routine shown in FIG. 13.

Figure 9:
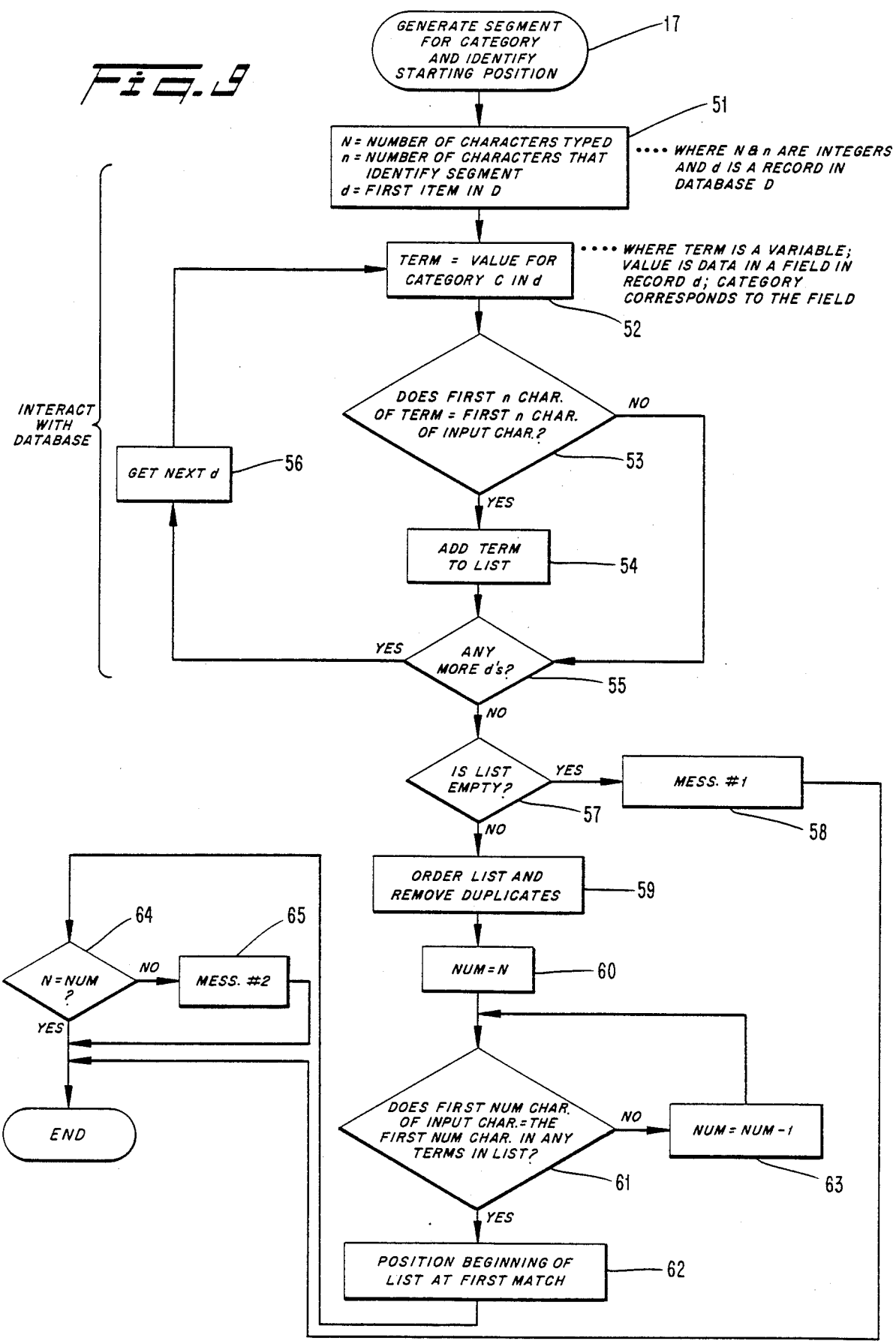
FIG. 9 is a subroutine for generating a segmented dynamic list from records in a data base.

The detail for generating a dynamic list from a data base is described in FIG. 9. As stated earlier, the programmer designates or determines which categories utilize static or dynamic lists, which lists are to be segmented or subdivided and which lists require a start position. In this sense, a category is assigned a dynamic list function. FIG. 9 is applicable to a dynamic list that is segmented and wherein the starting position of that list is under the control of the user. FIG. 9 is a clarification of step 17.

To begin, N is an integer set equal to the number of characters in the character string input by the user; n is an integer set equal to the number of characters used by the subroutine to identify the segment; d is initialized to be the first record in the data base, D (step 51). "Term" is set equal to the data field present in the field that corresponds to Category C in the current record d (step 52). As stated earlier, data field is a value representing the information in a field of a record.

If the first n characters of "term" match the first n characters of the input character string input by the user (step 53), "term" is added to the list (step 54). This begins the formation of a new dynamic list since "term" is then considered to be a search term or data set in the list. It is then determined if there are more records d in data base D (step 55). If there are, d is set equal to the next record in D (step 56) and the value of "term" is updated (step 52) to the next data field in the next record.

When there are no more record d's, it is determined if there are any terms (i.e., data sets) in the list (step 57). If the list does not contain any terms, there are no terms available for the user to select as a qualifier. A "feedback message" is then presented (message #1) that informs the user that there is no segment starting with any of the letters chosen and suggesting he start again by typing a different set of characters (step 58). If the list is not empty, it is put in order and duplicate terms are eliminated (step 59). The correlation between the searched out records and the terms in the dynamic list is ignored.

To identify the starting position of the newly formed dynamic list, an integer NUM is initialized to N (step 60). If there is a term in the list that matches the first NUM characters of the input character string (step 61), that term is placed in the first visible position on the screen and marked with the symbol *** that indicates the beginning of a list (step 62). If there is no term in the list that matches the first NUM character, NUM is decremented (step 63) until a match is found. Because N is greater than n and n is used to identify the segment, there will always be a match of at least n characters. In such a case where NUM is decremented, the term most closely matching the input character string is then marked and placed in the first visible position on the screen. Since the list will be starting with a term somewhat different than the term the user specified, a second "error message" (message #2) is presented. It will inform the user that there is no segment starting with all the letters typed, but that the first term starts with NUM letters (step 65).

The detailed flow chart for generating a dynamic list from a data base that is not segmented is described in FIG. 10. It is an expansion of step 15 in FIG. 8. To begin, variable d is initialized to equal the first record data base, D, (step 41). Variable d is set equal to the first record in data base D or set equal to all the fields in the record (the entire record is available to the program). The variable "term" is set equal to the data field in record d. The data field is in a field of the record that corresponds to the currently selected Category C (step 42). The "term" is added to the list (step 43). In another sense, data field is converted to a search term.

If there are more record d's in data base D (step 44), d is set equal to the next record in D (step 45) and the value of "term" is updated to equal data field from the new record (step 42). As stated earlier, data field is a value or a piece of information.

When there are no more additional record d s, the list is put in order and duplicate terms are eliminated (step 46). Any logical order (alphabetical, chronological, numerical, etc.) can be used. The duplicates are removed because the correlation between the data fields and the records is disregarded. The important aspect is that each term in the dynamic list corresponds to at least one record in existence in the data base.

The detailed flow chart for generating sublists from static lists and identifying a starting position for the sublist is presented in FIG. 11. FIG. 11 is a clarification of step 21. To begin, N is set equal to the number of characters input by the user; n is set equal to the number of characters used by the program to identify the segment; t is initialized to be equal to the first term in the list (step 71). If the first n characters of term t do not match the first n characters of the input character string (step 72), term t is removed from the list (step 73). If there are more t's in the list (step 74), t is set equal to the next term in the list (step 75). When there are no more terms in the list, it is determined if the list is empty (step 76). If the list is empty, "message #1", as described above, is presented (step 77).

To identify the starting position of the list, initialize integer NUM to N (step 78). If there is a term in the list that matches the first NUM characters of the character input string (step 79), place that term in the first visible position on the screen and mark it with the symbol *** that indicates the beginning of a list (step 80). If there is not a term in the list that matches the first NUM characters, NUM is decremented (step 81) until the closest match is found. If, after such a match is found, NUM does not equal N, "message #2" is presented (step 83).

The detailed flow chart for identifying the starting position in dynamic and static lists that are not segmented is presented in FIG. 12. FIG. 12 is a clarification of step 24. To begin, integer N is set equal to the number of characters input by the user (step 91). NUM is initialized to N (step 92). If there is a term in the list that matches the first NUM characters input (step 93), that term is placed in the first visible position on the screen and marked with the symbol that indicates the beginning of a list (step 94). If there is no such match, NUM is decremented (step 95) until a match is found or until NUM=0. If NUM is decremented to 0 (step 95), indicating that no match was found, "message #1" is presented (step 97). If a match is found, that term is placed in the first visible position on the screen and mark it with the symbol that indicates the beginning of a list (step 94). If NUM is not equal to N (step 98), "message #2" is presented in step 99.

FIG. 13 illustrates the flow chart of the control subroutine. FIG. 13 is a D type flow chart as is recognized in the art. The various steps are clearly laid out in that Figure. It is to be noted that "D" represents the ultimate data base subset having all the records retrieved using the displayed and selected search terms obtained by operation of the program. Either the program retrieves the entire record or maintains a list of the accession numbers of all the records found using the search terms. Therefore, under the Display Present Records routine, the first record from D is obtained and then displayed. In addition, a status line is included showing "#of D", such as "1 of 10", identifying that this record is the first record of 10 records in the Data Base subset D. As shown at the end of that routine, actuating the return (-R-) key calls back the "filled out" screen with all the displayed and selected terms are shown thereon. The other routines, such as Modify Selections, were described earlier.

FIG. 14 is a schematic of the data base structure for the particular embodiment of the hotel data base. To speed the search of the data base, certain indexes are formed from the main file. For example, Index a is the State/City Index. Each item in Index a includes a two letter state code followed by the first letter of the city in the particular state. Thereafter, some type of identifier or correlator between Index a and the main file is present which is illustrated in FIG. 14 by address 2 and address 4 symbolized by $Ad_2$ and $Ad_4$. The index is formed primarily to speed the generation of the dynamic list for the applications program. However, when the dynamic list is anticipated to be relatively small (for example, less than 50 records), an index to the main file probably is not necessary. Index b is the three character airport code for the main file. Index c is the state code, entire city, and the first letter of the hotel name. Index d is the two character state code, the first character of the business reference. All index records, shown by the boxes in the index files, include the relevant addresses of the records in the main file. For example, record 4 in the main file relates to the Marriott Gateway Hotel in Arlington, Va., very near Washington National Airport (DCA) and also relatively near the Pentagon, the headquarters of the U.S. Department of Defense. The index files for main file record 4 are shown in FIG. 14.

The present invention can be used in conjunction with a data base that is commercially available and accessible via a telecommunications network. The following example uses DIALOG Information Retrieval Service, File 150, Legal Resource Index (herein LRI). The LRI data base file includes law and law related literature and DIALOG provides search capabilities through the data fields in the fields of each record.

The available fields to search are shown in FIG. 15. For simplicity, consider the following fields for a screen display.

| Article Type | Journal Name |
| Author | Jurisdiction |
| Case Name | Publication Year |

The screen can be set up as shown in FIG. 16.

To access the LRI data base, one unique key or one field unique to each record is required. In this case, each record has what DIALOG calls an "Accession Number". If there was no unique key for each record, the programmer would build a table and number the records as they appear in the file (i.e., the first record would be referenced as #1, the second as #2, etc.).

Next, a MATCH TABLE is established in the computer accessing the LRI data base as follows:

| MATCH TABLE | |
| --- | --- |
| accession #1 | ... match? |
| accession #2 | ... match? |
| o | . |
| o | . |
| o | . |
| accession #n | ... match? |

For each record in the data base there is exactly one entry in the MATCH TABLE. The "Match?" field is "True" for each entry in the MATCH TABLE at the beginning of the program. This means that when no qualifiers or search terms have been chosen, all the records in the data base could conceivably match the user's search criteria. The MATCH TABLE is used for two purposes: to decrease the size of the considered data base as the qualifiers (search terms) are selected and to build dynamic lists from the current data base.

The cursor would be positioned at the location immediately to the right of the categorical identifier Article Type in FIG. 15. Based upon a description of the LRI data base, the article types are classified as follows:

Article
Book Review
Case Note
President's Page
Column
Letter to the Editor
Obituary
Transcript
Biographical Piece
Editorial As described above, the static list could be scrolled through by the user. After the user selects one of the Article Types, the program loops through the MATCH TABLE looking for entries with "Match?"=TRUE. When such an entry is found, the record is retrieved and examined by using the Accession Number from the LRI data base to see if it contains the displayed and selected Article Type. If it does, the MATCH TABLE is not changed and the program obtains the next record per the listed Accession Number. If the record is not of the desired Article Type, the program marks the "Match?" field FALSE in the MATCH TABLE. This action means this record does not match the user's criteria and will not be considered in later searches.

To review, the general procedure for eliminating non-matching records after a qualifier (a search term) is selected is as follows. Loop through the MATCH TABLE. For each entry that has "Match?"=TRUE, check to see that the corresponding record in the data base contains the qualifier selected. If it does not, change the "Match?" field for this entry to FALSE.

Next, the program may construct a dynamic list of authors for a certain article type. There are two types of dynamic lists that may be constructed: segmented and non-segmented. First, consider non-segmented dynamic list construction.

If the selected Article Type is a Column, the Author list may be formed as a non-segmented dynamic list. When the user's cursor is positioned at the Author location, a search through the LRI data base subset of Columns takes place. The MATCH TABLE is used to generate a list of Author terms for the user. Loop through the TABLE looking for entries that have "Match?"=TRUE. Upon finding such an entry, retrieve the record and place the data field for the Author field into the dynamic Author list. After examining all matching records in the data base, sort the Author list and remove duplicate entries. The list is then displayed for the user.

Author could also be a segmented dynamic list. To construct segmented dynamic lists, the programmer must decide on the number of letters that will identify the segment and the number of letters that the user will be able to type to identify the starting position within the list. One solution is to identify segments by the first three letters of each term in the list and to allow the user to type eight letters to identify a starting position. If the user is looking for an author named Brown, he would enter BROWN (Return) on the first line after the "Author:" prompt. Thereafter, the program generates a segment consisting of all authors that begin with the letters "BRO", since the programmer uses three letters to identify a segment. The input character string "BROWN" identifies the starting position within the sublist, because the program uses up to eight letters to identify the starting position.

After inputting the character string, the program loops through the MATCH table looking for entries with "Match?"=TRUE. After finding such an entry, the program retrieves the record and examines the Author field of the record. If the field begins with the same characters the user typed (in this case "BRO"), the program puts the author's name the data field) into the dynamic Author list. If the data field does not match, the program continues looping through the MATCH TABLE. When all entries with "Match?"=TRUE are examined, the program sorts the Author list and removes duplicate entries. The list is then displayed for the user. After the list is displayed and the user selects one desired term, the MATCH TABLE is used to decrease the size of the data base.

After the user has selected as many terms as desired, the control command list is presented proximate the procedure category. Upon selecting the appropriate command, the remaining records in the MATCH TABLE are searched, retrieved and displayed.

In the claims, each term in the list is called a "data set" since the terms may be a single word, a phrase or series of words interrelated by some logical operator. The particular equipment used in the hotel data base example is a Digital Equipment Corp. MicroVAX computer having a three megabyte memory.

It should be appreciated that techniques are described herein for limiting the user intervention in the first few steps of the hotel data base example, i.e., the selection of a term from the Location category. Therefore, a static list including terms representing state codes and a static or a dynamic list for airports representing the three character airport codes could be incorporated herein. The static state code list would require the user to input at least the first character of the state such that the static list is segmented to certain states (e.g., all states being with "M") so the user does not have to scroll through the entire list of 52 states. The airport code could be listed based upon the closest city to the airport, the airport name itself or other logical item related to the airport as input by the user as an input character string. In an alternative embodiment, the Type of Lodging category is a dynamic list rather than a static list. The formation of such a dynamic list is apparent based on the description herein.

It is important to note that the specific embodiment illustrated in FIG. 4 does not show blank data sets or blank terms in the static lists. Also, the static lists are not complete but are, in fact, abbreviated in order to simplify the explanation of the present invention.

The order of presentation of the categories is primarily based on the expectation of the user and particularly on what questions the user would ask to initially search through the data base.

It is apparent that the present program can be easily linked with a search routine through a data base. It is important to note that the program must obtain the data field for a particular category in a set of records in order to formulate the dynamic list described herein. Therefore, the present invention must be interactive with the data base search routine to utilize this feature.

The claims appended hereto are meant to cover these and other modifications of the present invention.

What we claim is:

1. A method of selecting desired data sets from a plurality of data sets that are categorized and sequentially ordered into a plurality of lists, comprising the steps of:

continuously displaying a plurality of categorical identifiers at respective coordinates on a display medium, at least some of said categorical identifiers being displayed simultaneously during at least a portion of the displaying of said categorical identifiers, and each of said categorical identifiers corresponding to at least one of said plurality of lists;

providing two control inputs, one as a scrolling control and a second as a select control;

sequentially displaying, one at a time, data sets in one list corresponding to a respective one of said displayed categorical identifiers upon sequential application of said scrolling control;

selecting a desired data set that is currently displayed and selecting another of said displayed categorical identifiers corresponding to another one of said plurality of lists, both upon application of said select control;

sequentially displaying, one at a time, sequential data sets of respective additional lists next to said another displayed categorical identifier and any desired additional displayed categorical identifiers, upon application of said scrolling control; and selecting respective data sets of said another displayed categorical identifier and each of said desired additional displayed categorical identifiers, and moving to respective ones of each of said desired additional displayed categorical identifiers, both upon application of said select control.

2. A method of selecting desired data sets as claimed in claim 1 which, after at least one of the steps of selecting a desired and displayed data set for a respective one of said displayed categorical identifiers, includes the step of sequentially displaying, one at a time, sequential data sets of a second list related to said respective one displayed categorical identifier, and selecting one of the data sets from said second list, before selecting another of said displayed categorical identifiers.

3. A method of displaying as claimed in claim 2, further including providing a third control input as a reverse scroll control and wherein forward sequential display occurs upon sequential actuation of said scrolling control and reverse sequential display occurs upon sequential actuation of said reverse sequential control.

4. A method of selectively desired data sets as claimed in claim 1 wherein one categorical list and the associated group of data sets represents a control list and each data set therein represents a control command.

5. A method of selectively desired data sets as claimed in claim 4 wherein one control command is a clear display command and the method includes clearing all displayed data sets when the data set representing said clear display command is displayed via said scrolling control and selected via said select control.

6. A method of selectively desired data sets as claimed in claim 4 wherein one control command is a modify selection command and the method further includes changing a displayed and selected data set of one category to a new data set based upon the application of said select control when the data set representing said modify selection command is displayed and selected via said scrolling control and said select control and based upon the application of said select control and said scrolling control to display and select said new data set from said one category.

7. A method of selecting desired data sets as claimed in claim 4 wherein one control command data set is an output data command, and the method further includes the step of outputting records containing other displayed and selected data sets when the data set representing said output data command is displayed and selected via said scrolling and select controls.

8. A system for selecting desired data sets from a plurality of data sets that are categorized into a plurality of lists comprising:

display means for continuously displaying a plurality of categorical identifiers at respective coordinates on a display medium, at least some of said categorical identifiers being displayed simultaneously during at least a portion of the displaying of said categorical identifiers, and each of said categorical identifiers corresponding to at least one of said plurality of lists;

a scrolling control input and a select control input;

means for sequentially displaying, one at a time, sequential data sets of one list corresponding to a respective one of said display categorical identifiers upon sequential application of said scrolling control input; and means for selecting the currently displayed data set from said one list and for selecting another of said displayed categorical identifiers corresponding to another one of said plurality of lists, both under the control of said select control input;

said sequential displaying means sequentially displaying, one at a time, sequential data sets of respective additional lists next to said another displayed categorical identifier and any desired additional displayed categorical identifers upon application of said scrolling control; and said selecting means selecting respective data sets of said another displayed categorical identifer and each of said desired additional displayed categorical identifiers, and selecting respective ones of each of said desired additional displayed categorical identifiers, both upon application of said select control.

9. A system for selecting desired data sets as claimed in claim 8 wherein said lists are stored in respective separate circulating storages and the data sets of said lists are displayed, one at a time, at respective coordinates of said display medium by said searching and displaying means.

10. A system for selectively desired data sets as claimed in claim 9 wherein one categorical list represents a control list and each data set therein represents a control command.

11. A system as claimed in claim 10 wherein one control command is a clear display command and the system further comprises means for clearing all displayed data sets when the data set representing said clear display command is displayed via said scrolling control input and selected via said select control input.

12. A system as claimed in claim 10 wherein one control command is a modify data command and the system further comprises means for changing a displayed and selected data set for a corresponding category to a new data set in said corresponding category when the data set representing said modify data command is displayed and selected and when said new data set is displayed and selected for said corresponding category.

13. A system for selecting desired data sets as claimed in claim 10 wherein one control command data set is an output data command, and the system further comprising means for outputting records containing other displayed and selected data sets when said output data command is displayed and selected via said scrolling and select control inputs.

14. A method of selecting desired data sets as claimed in claim 1 wherein one categorical list, that comprises a group of data sets, represents a control list and each data set therein represents a control command data set, and one control command is an output data command.

15. A method of selecting desired data sets as claimed in claim 14, further including the step of compiling and outputting records containing other displayed and selected data sets upon application of said output data command that occurs when the data set representing said output data command is displayed and selected via said scrolling and select controls.

16. A method of selecting desired data sets as claimed in claim 15 which, after at least one of the steps of selecting a desired and displayed data set for a respective one of said displayed categorical identifiers, includes the step of sequentially displaying, one at a time, sequential data sets of a second list related to said respective one displayed categorical identifier, and selecting one of the data sets from said second list, before selecting another of said displayed categorical identifiers via said select control.

17. A method of selecting desired data sets as claimed in claim 16 wherein said plurality of data sets comprises a first, a second and a third type of data sets, said first type of data sets being category instruction commands, said second type of data sets being said other data sets and being search terms, and said third type of data sets being the group of control command data sets, the method further including the steps of:

providing a data base of said records, each record having data fields searchable by using said search terms, and said data fields being classified into categories corresponding at least in part to said categorical lists;

searching for those records having data fields corresponding to said search terms represented by selected data sets of the same category upon application of said select control;

repeating the searching step with only the records found previously when further search terms are selected upon the further application; of said select control; and shifting to the category as directed by said category instruction command represented by a respective first type of data set upon application of said select control.

18. A method of selecting desired data sets as claimed in claim 16 wherein lists exceeding a predetermined length are segmented by:

requiring an input character string to be input that matches at least in part a character string in at least one search term in the list to be segmented;

creating a sublist from said list to be segmented having all search terms that match at least in part said input character string;

discarding all duplicate search terms from said sublist;

placing at the beginning of the sublist the search term that most closely matches said input character string; and sequentially displaying search terms only in said sublist upon application of said scrolling control.

19. A method of selecting desired data sets as claimed in claim 15, further including the steps:

assigning some categories as having a dynamic list function;

obtaining a data field from each record in at least a portion of said data base, said data field obtained from a record category corresponding to a currently selected category assigned said dynamic list function, and forming a new dynamic list wherein the obtained data fields are treated as search terms for said new dynamic list;

discarding duplicate search terms from said new dynamic list;

thereafter sequentially displaying said new dynamic list upon application of said scrolling control.

20. A method of selecting desired data sets as claimed in claim 19 wherein prior to said step of obtaining data fields, the method includes the steps of:

requiring a search limiter string to be input when the category selected has an assigned dynamic list function; and limiting the formation of said new dynamic list to only those data fields having at least one character match with a character in said search limiter string.

21. A system for selecting desired data sets as claimed in claim 8 wherein one categorical list, that comprises a group of data sets, represents a control list and each data set therein represents a control command, and one control command data set is an output data command.

22. A system for selecting desired data sets as claimed in claim 21, further including means for compiling and outputting the records containing other displayed and selected data sets upon receipt of said output data command after display and selection thereof via said scrolling and select control inputs.

23. A system for selecting as claimed in claim 22, further including means for selecting a second list related to said one displayed categorical identifier after selecting the currently displayed data set from said one list and before selecting said another category under the control of said select control input.

24. A system for selecting desired data sets as claimed in claim 23 wherein said plurality of data sets comprises a first, a second and a third type of data sets, said first type of data sets being category instruction commands, said second type of data sets being search terms, and said third type of data sets being said control commands, the system including:

a data base of said records, each record having data fields searchable by said search terms, said data fields being classified into categories corresponding at least in part to said categorical lists;

means for obtaining those records having data fields corresponding to said search terms represented by selected data sets of the same category upon receipt of said select control input;

means for limiting the records available to said means for obtaining to those records previously obtained via said search terms when said means for selecting selects further search terms; and means for shifting to the category as directed by said category instruction command represented by a respective selected data set upon receipt of said select control input.

25. A system for selecting desired data sets as claimed in claim 24, further including:

means for inputting an input character string when one of said lists is lengthy and exceeds a predetermined length;

means for determining a match between at least some characters in at least one search term in the lengthy list and said input character string;

means for creating a sublist from said lengthy list having all search terms that match at least in part said input character string;

means for placing at the beginning of the sublist the search term that most closely matches said input character string and making said sublist available to said means for sequentially displaying.

26. A system for selecting desired data sets as claimed in claim 25, further wherein some categories are assigned a dynamic list function, the system further comprising;

means for compiling a new dynamic list by obtaining data fields of one or more records having categories corresponding to a currently selected category assigned said dynamic list function, and for converting the obtained data fields into search terms;

means for discarding duplicate search terms from said new dynamic list and for organizing said new dynamic list; and, means for supplying said new dynamic list to said means for sequentially displaying.

27. A system of selecting desired data sets as claimed in claim 26, further including:

means for inputting a search limiter string when the category selected has an assigned dynamic list function; and, means for limiting the formation of said new dynamic list to only those data fields having at least one character match with a character in said input search limiter string.

28. A method of selecting at least one record from a data base having a plurality of records, each record having data fields in predetermined categories, comprising the steps of:

continuously displaying a plurality of categorical identifiers at respective coordinates on a display medium, at least some of said categorical identifiers being displayed simultaneously during at least a portion of the displaying of said categorical identifiers, and at least one of said categorical identifiers corresponding to a respective one of said predetermined categories;

providing a group of data sets which represent a control list and each data set thereon represents a control command, and one control command is an output data command, the control list being associated with a control categorical identifier;

obtaining data fields from records out of a selected category corresponding to a respective one of said displayed categorical identifiers and forming a dynamic list and said data fields, said data fields being converted into search terms;

discarding all duplicate search terms from said dynamic list;

sequentially displaying, one at a time, said search terms in said dynamic list upon sequential application of a scrolling control;

selecting a desired first search term that is currently displayed and selecting another of said displayed categorical identifiers, both upon application of said select control;

selecting at least one additional search term by essentially repeating the sequential displaying and selecting steps used to select said first search term;

using the displayed and selected search terms as a search request; and retrieving from said data base one or more records matching said search request upon application of said output data command by displaying the data set representing said output data command and selecting said output data command data set via said scrolling and select controls.

29. A method of selecting as claimed in claim 28 further including the steps of:
- providing another plurality of search terms that are categorized and sequentially ordered into a plurality of static lists;
- wherein the step of continuously displaying includes displaying categorical identifiers corresponding to each of said plurality of static lists; and
- wherein the step of sequentially displaying includes displaying the respective search terms in the static list corresponding to a currently selected categorical identifer upon sequential application of said scrolling control.

30. A system for selecting at least one record from a data base having a plurality of records, each record having data fields in predetermined categories, comprising:
- display means for continuously displaying a plurality of categorical identifiers at respective coordinates on a display medium, at least some of said categorical identifiers being displayed simultaneously during at least a portion of the displaying of said categorical identifiers, and at least one of said categorical identifiers corresponding to a respective one of said predetermined categories;
- a scrolling control input and a select control input;
- a control list comprised of a group of data sets, each data set therein representing a control command, and one control command being an output data command, the control list being associated with a control categorical identifiers;
- means for compiling a dynamic list by obtaining data fields from records out of one predetermined category corresponding to a respective one of said displayed categorical identifiers and for converting the obtained data fields into search terms;
- means for discarding duplicate search terms from said dymanic list;
- means for sequentially displaying, one at a time, search terms of one dynamic list corresponding to a respective one of said displayed categorical identifiers upon sequential application of said scrolling control input;
- means for selecting the currently displayed search term from said one dynamic list and for selecting another of said displayed categorical identifiers, both under the control of said select control input, said scrolling control input and said select control input then being operable to select at least one additional search term to for a search request; and
- means for retrieving from said data base one or more records matching said search request upon receipt of said output data command by display and selection thereof at said control categorical identifier via said scrolling and select control inputs.

31. A method of selecting desired data sets as claimed in claim 1, wherein said categorical identifiers and each prior-selected data set are continuously displayed simultaneously during the selection of each subsequent data set.

32. A method of selecting desired data sets as claimed in claim 1, wherein said categorical identifiers and data sets are displayed at their respective coordinates on a computer screen which forms the display medium, and the provided scrolling and select controls are respective keys of a computer terminal keyboard.

33. A method of selecting desired data sets as claimed in claim 32, further comprising providing reverse scrolling control using a third key of the computer terminal keyboard.

34. A method of selecting desired data sets as claimed in claim 32, wherein the selecting of a currently displayed data set and another categorical identifier is accomplished by a single application of said select control key.

35. A system for selecting desired data sets as claimed in claim 8 wherein said categorical identifier displaying means continuously displays said categorical identifiers simultaneously and each prior-selected data set remains displayed during the selection of each subsequent data set.

36. A system for selecting desired data sets as claimed in claim 8, further comprising a computer having a terminal keyboard and a computer screen which forms said display medium and upon which said categorical identifiers and data sets are displayed by their respective displaying means at their respective coordinates, and wherein said scrolling and select controls are respective keys of the terminal keyboard.

37. A system for selecting desired data sets as claimed in claim 36, further comprising a reverse scrolling control responsive to operation of a third key o the computer terminal keyboard.

38. A system for selecting as claimed in claim 36, wherein said selecting desired data sets means selects said currently displayed data set and another categorical identifier in response to a single operation of said select control key.

* * * * *

UNITED STATES PATENT AND TRADEMARK OFFICE
CERTIFICATE OF CORRECTION

PATENT NO. : 4,879,648
DATED : November 7, 1989
INVENTOR(S) : COCHRAN, et al.

It is certified that error appears in the above-identified patent and that said Letters Patent is hereby corrected as shown below:

On the title page, item (54) and Column 1:

Title, line 3, "SELECTIONS" should read --SELECTION--.

Column 24:

Claim 3, line 1, "displaying" should read --selecting desired data sets--.

Claims 4, 5, 6 and 10, line 1 of each claim, "selectively" should read --selecting--.

Claim 4, bridging lines 2 and 3, "-and the associated group of data sets" should be deleted.

Claim 5, line 3, after "method", --further-- should be inserted.

Column 25:

Columns 27-30:

Claims 23 and 38, line 1 of each claim, after "selecting", --desired data sets-- should be inserted.

Claim 38, line 2, "desired data sets" should be deleted.

Signed and Sealed this

First Day of February, 1994

Attest:

BRUCE LEHMAN

*Attesting Officer*     *Commissioner of Patents and Trademarks*